United States Patent
James

(10) Patent No.: US 7,461,286 B2
(45) Date of Patent: Dec. 2, 2008

(54) SYSTEM AND METHOD FOR USING A LEARNING SEQUENCE TO ESTABLISH COMMUNICATIONS ON A HIGH-SPEED NONSYNCHRONOUS INTERFACE IN THE ABSENCE OF CLOCK FORWARDING

(75) Inventor: Ralph James, Andover, MN (US)

(73) Assignee: Micron Technology, Inc., Boise, ID (US)

( * ) Notice: Subject to any disclaimer, the term of this patent is extended or adjusted under 35 U.S.C. 154(b) by 61 days.

(21) Appl. No.: 11/433,181

(22) Filed: May 11, 2006

(65) Prior Publication Data

US 2006/0206742 A1    Sep. 14, 2006

Related U.S. Application Data

(63) Continuation of application No. 10/695,383, filed on Oct. 27, 2003, now Pat. No. 7,137,024.

(51) Int. Cl.
*G06F 1/04*    (2006.01)
(52) U.S. Cl. .................. 713/503; 713/500; 713/600; 370/298; 370/905; 714/699; 714/700; 714/814; 714/815
(58) Field of Classification Search .............. 713/500, 713/503, 600
See application file for complete search history.

(56) References Cited

U.S. PATENT DOCUMENTS

| | | | |
|---|---|---|---|
| 3,633,174 A | 1/1972 | Griffin | 340/172.5 |
| 3,742,253 A | 6/1973 | Kronies | 307/247 |
| 3,777,154 A | 12/1973 | Lindsey | 250/227 |
| 4,004,100 A | 1/1977 | Takimoto | 179/15 BS |
| 4,045,781 A | 8/1977 | Levy et al. | 364/200 |
| 4,077,016 A | 2/1978 | Sanders et al. | 331/4 |
| 4,096,402 A | 6/1978 | Schroeder et al. | 307/362 |
| 4,240,143 A | 12/1980 | Besemer et al. | 364/200 |

(Continued)

FOREIGN PATENT DOCUMENTS

EP        0 171 720 A2    2/1986

(Continued)

OTHER PUBLICATIONS

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

(Continued)

*Primary Examiner*—Nitin C. Patel
(74) *Attorney, Agent, or Firm*—Dorsey & Whitney LLP

(57) ABSTRACT

A memory system includes a memory hub controller that sends write data to a plurality of memory modules through a downstream data bus and receives read data from the memory modules through an upstream data bus. The memory hub controller includes a receiver coupled to the upstream data bus and a transmitter coupled to the downstream data bus. Similarly, each of the memory modules includes a receiver coupled to the downstream data bus and a transmitter coupled to the upstream data bus. Each receiver includes a receive clock generator that is synchronized by coupling a known pattern of data to the receiver. The receiver determines which phase of the receive clock best captures the known pattern and uses that receive clock phase during normal operation.

29 Claims, 6 Drawing Sheets

U.S. PATENT DOCUMENTS

| | | | |
|---|---|---|---|
| 4,245,306 A | 1/1981 | Besemer et al. | 364/200 |
| 4,253,144 A | 2/1981 | Bellamy et al. | 364/200 |
| 4,253,146 A | 2/1981 | Bellamy et al. | 364/200 |
| 4,404,474 A | 9/1983 | Dingwall | 307/260 |
| 4,443,845 A | 4/1984 | Hamilton et al. | 364/200 |
| 4,481,625 A | 11/1984 | Roberts et al. | 370/85 |
| 4,508,983 A | 4/1985 | Allgood et al. | 307/577 |
| 4,511,846 A | 4/1985 | Nagy et al. | 328/164 |
| 4,514,647 A | 4/1985 | Shoji | 307/269 |
| 4,524,448 A | 6/1985 | Hullwegen | 375/118 |
| 4,573,017 A | 2/1986 | Levine | 327/114 |
| 4,600,895 A | 7/1986 | Landsman | 331/1 A |
| 4,603,320 A | 7/1986 | Farago | 341/89 |
| 4,608,702 A | 8/1986 | Hirzel et al. | 375/110 |
| 4,638,187 A | 1/1987 | Boler et al. | 307/451 |
| 4,638,451 A | 1/1987 | Hester et al. | 395/889 |
| 4,687,951 A | 8/1987 | McElroy | 307/269 |
| 4,697,167 A | 9/1987 | O'Keeffe et al. | 340/347 |
| 4,707,823 A | 11/1987 | Holdren et al. | 370/1 |
| 4,724,520 A | 2/1988 | Athanas et al. | 364/200 |
| 4,727,541 A | 2/1988 | Mori et al. | 370/112 |
| 4,740,962 A | 4/1988 | Kish, III | 370/102 |
| 4,746,996 A | 5/1988 | Furuhata et al. | 360/36.2 |
| 4,773,085 A | 9/1988 | Cordell | 375/120 |
| 4,789,796 A | 12/1988 | Foss | 307/443 |
| 4,791,622 A | 12/1988 | Clay et al. | 369/59 |
| 4,813,772 A | 3/1989 | Kowel et al. | 350/388 |
| 4,818,995 A | 4/1989 | Takahashi et al. | 341/94 |
| 4,823,403 A | 4/1989 | Twietmeyer | 455/607 |
| 4,825,208 A | 4/1989 | Mueller et al. | 340/825.02 |
| 4,831,520 A | 5/1989 | Rubinfeld et al. | 364/200 |
| 4,891,808 A | 1/1990 | Williams | 370/112 |
| 4,893,087 A | 1/1990 | Davis | 328/14 |
| 4,902,986 A | 2/1990 | Lesmeister | 331/25 |
| 4,924,516 A | 5/1990 | Bremer et al. | 380/46 |
| 4,930,128 A | 5/1990 | Suzuki et al. | 371/12 |
| 4,953,128 A | 8/1990 | Kawai et al. | 365/194 |
| 4,953,930 A | 9/1990 | Ramsey et al. | 350/96.11 |
| 4,958,088 A | 9/1990 | Farah-Bakhsh et al. | 307/443 |
| 4,972,470 A | 11/1990 | Farago | 380/3 |
| 4,979,185 A | 12/1990 | Bryans et al. | 375/20 |
| 4,984,204 A | 1/1991 | Sato et al. | 365/189.11 |
| 4,984,255 A | 1/1991 | Davis et al. | 375/106 |
| 5,020,023 A | 5/1991 | Smith | 364/900 |
| 5,038,115 A | 8/1991 | Myers et al. | 331/2 |
| 5,062,082 A | 10/1991 | Choi | 365/230.06 |
| 5,075,569 A | 12/1991 | Branson | 307/270 |
| 5,086,500 A | 2/1992 | Greub | 395/550 |
| 5,087,828 A | 2/1992 | Sato et al. | 307/269 |
| 5,113,519 A | 5/1992 | Johnson et al. | 395/600 |
| 5,120,990 A | 6/1992 | Koker | 307/269 |
| 5,122,690 A | 6/1992 | Bianchi | 307/475 |
| 5,128,560 A | 7/1992 | Chern et al. | 307/475 |
| 5,128,563 A | 7/1992 | Hush et al. | 307/482 |
| 5,130,565 A | 7/1992 | Girmay | 307/265 |
| 5,134,311 A | 7/1992 | Biber et al. | 307/270 |
| 5,150,186 A | 9/1992 | Pinney et al. | 357/42 |
| 5,165,046 A | 11/1992 | Hesson | 307/270 |
| 5,168,199 A | 12/1992 | Huffman et al. | 315/370 |
| 5,179,298 A | 1/1993 | Hirano et al. | 307/443 |
| 5,182,524 A | 1/1993 | Hopkins | 330/149 |
| 5,194,765 A | 3/1993 | Dunlop et al. | 307/443 |
| 5,212,601 A | 5/1993 | Wilson | 360/51 |
| 5,220,208 A | 6/1993 | Schenck | 307/443 |
| 5,223,755 A | 6/1993 | Richley | 307/603 |
| 5,229,929 A | 7/1993 | Shimizu et al. | 363/98 |
| 5,233,314 A | 8/1993 | McDermott et al. | 331/17 |
| 5,233,564 A | 8/1993 | Ohshima et al. | 365/230.05 |
| 5,239,206 A | 8/1993 | Yanai | 307/272.2 |
| 5,241,506 A | 8/1993 | Motegi et al. | 365/210 |
| 5,243,703 A | 9/1993 | Farmwald et al. | 395/325 |
| 5,251,303 A | 10/1993 | Fogg, Jr. et al. | 395/275 |
| 5,254,883 A | 10/1993 | Horowitz et al. | 307/443 |
| 5,256,989 A | 10/1993 | Parker et al. | 331/1 A |
| 5,257,294 A | 10/1993 | Pinto et al. | 375/120 |
| 5,268,639 A | 12/1993 | Gasbarro et al. | 324/158 R |
| 5,269,022 A | 12/1993 | Shinjo et al. | 395/700 |
| 5,272,729 A | 12/1993 | Bechade et al. | 375/118 |
| 5,274,276 A | 12/1993 | Casper et al. | 307/443 |
| 5,276,642 A | 1/1994 | Lee | 365/189.04 |
| 5,278,460 A | 1/1994 | Casper | 307/296.5 |
| 5,281,865 A | 1/1994 | Yamashita et al. | 307/279 |
| 5,283,631 A | 2/1994 | Koerner et al. | 307/451 |
| 5,289,580 A | 2/1994 | Latif et al. | 395/275 |
| 5,295,164 A | 3/1994 | Yamamura | 375/120 |
| 5,304,952 A | 4/1994 | Quiet et al. | 331/1 A |
| 5,307,381 A | 4/1994 | Ahuja | 375/107 |
| 5,311,481 A | 5/1994 | Casper et al. | 365/230.06 |
| 5,311,483 A | 5/1994 | Takasugi | 365/233 |
| 5,313,431 A | 5/1994 | Uruma et al. | 365/230.05 |
| 5,313,590 A | 5/1994 | Taylor | 395/325 |
| 5,315,269 A | 5/1994 | Fujii | 331/1 A |
| 5,315,388 A | 5/1994 | Shen et al. | 348/718 |
| 5,317,752 A | 5/1994 | Jewett et al. | 395/750 |
| 5,319,755 A | 6/1994 | Farmwald et al. | 395/325 |
| 5,321,368 A | 6/1994 | Hoelzle | 328/63 |
| 5,327,553 A | 7/1994 | Jewett et al. | 395/575 |
| 5,337,285 A | 8/1994 | Ware et al. | 365/227 |
| 5,341,405 A | 8/1994 | Mallard, Jr. | 375/120 |
| 5,347,177 A | 9/1994 | Lipp | 307/443 |
| 5,347,179 A | 9/1994 | Casper et al. | 307/451 |
| 5,355,391 A | 10/1994 | Horowitz et al. | 375/36 |
| 5,361,002 A | 11/1994 | Casper | 327/530 |
| 5,367,649 A | 11/1994 | Cedar | 395/375 |
| 5,379,299 A | 1/1995 | Schwartz | 370/108 |
| 5,379,382 A * | 1/1995 | Work et al. | 710/63 |
| 5,390,308 A | 2/1995 | Ware et al. | 395/400 |
| 5,400,283 A | 3/1995 | Raad | 365/203 |
| 5,402,389 A | 3/1995 | Flannagan et al. | 365/233 |
| 5,408,640 A | 4/1995 | MacIntyre et al. | 395/550 |
| 5,410,263 A | 4/1995 | Waizman | 327/141 |
| 5,414,819 A | 5/1995 | Redmond et al. | 395/325 |
| 5,416,436 A | 5/1995 | Rainard | 327/270 |
| 5,416,909 A | 5/1995 | Long et al. | 395/275 |
| 5,420,544 A | 5/1995 | Ishibashi | 331/11 |
| 5,423,009 A | 6/1995 | Zhu | 395/325 |
| 5,424,687 A | 6/1995 | Fukuda | 331/11 |
| 5,428,311 A | 6/1995 | McClure | 327/276 |
| 5,428,317 A | 6/1995 | Sanchez et al. | 331/1 A |
| 5,430,408 A | 7/1995 | Ovens et al. | 327/407 |
| 5,430,676 A | 7/1995 | Ware et al. | 365/189.02 |
| 5,432,823 A | 7/1995 | Gasbarro et al. | 375/356 |
| 5,432,907 A | 7/1995 | Picazo, Jr. et al. | 395/200 |
| 5,438,545 A | 8/1995 | Sim | 365/189.05 |
| 5,440,260 A | 8/1995 | Hayashi et al. | 327/278 |
| 5,440,514 A | 8/1995 | Flannagan et al. | 365/194 |
| 5,442,770 A | 8/1995 | Barratt | 395/403 |
| 5,444,667 A | 8/1995 | Obara | 365/233 |
| 5,446,696 A | 8/1995 | Ware et al. | 365/222 |
| 5,448,193 A | 9/1995 | Baumert et al. | 327/156 |
| 5,451,898 A | 9/1995 | Johnson | 327/563 |
| 5,457,407 A | 10/1995 | Shu et al. | 326/30 |
| 5,461,627 A | 10/1995 | Rypinski | 370/95.2 |
| 5,463,337 A | 10/1995 | Leonowich | 327/158 |
| 5,465,076 A | 11/1995 | Yamauchi et al. | 331/179 |
| 5,465,229 A | 11/1995 | Bechtolsheim et al. | 345/477 |
| 5,473,274 A | 12/1995 | Reilly et al. | 327/159 |
| 5,473,575 A | 12/1995 | Farmwald et al. | 365/230.06 |
| 5,473,639 A | 12/1995 | Lee et al. | 375/376 |
| 5,479,370 A | 12/1995 | Furuyama et al. | 365/189.12 |
| 5,485,490 A | 1/1996 | Leung et al. | 375/371 |
| 5,488,321 A | 1/1996 | Johnson | 327/66 |
| 5,489,864 A | 2/1996 | Ashuri | 327/161 |
| 5,497,127 A | 3/1996 | Sauer | 331/17 |

| Patent | Date | Inventor | Class |
|---|---|---|---|
| 5,497,355 A | 3/1996 | Mills et al. | 365/230.08 |
| 5,497,476 A | 3/1996 | Oldfield et al. | 395/439 |
| 5,498,990 A | 3/1996 | Leung et al. | 327/323 |
| 5,500,808 A | 3/1996 | Wang | 364/578 |
| 5,502,621 A | 3/1996 | Schumacher et al. | 361/760 |
| 5,502,672 A | 3/1996 | Kwon | 365/189.05 |
| 5,506,814 A | 4/1996 | Hush et al. | 365/230.03 |
| 5,508,638 A | 4/1996 | Cowles et al. | 326/38 |
| 5,513,327 A | 4/1996 | Farmwald et al. | 395/309 |
| 5,515,403 A | 5/1996 | Sloan et al. | 375/371 |
| 5,532,714 A | 7/1996 | Knapp et al. | 345/114 |
| 5,539,345 A | 7/1996 | Hawkins | 327/150 |
| 5,544,124 A | 8/1996 | Zagar et al. | 365/230.08 |
| 5,544,203 A | 8/1996 | Casasanta et al. | 375/376 |
| 5,544,319 A | 8/1996 | Acton et al. | 395/200.07 |
| 5,544,345 A | 8/1996 | Carpenter et al. | 395/477 |
| 5,550,515 A | 8/1996 | Liang et al. | 331/11 |
| 5,550,549 A | 8/1996 | Procter, Jr. et al. | 342/47 |
| 5,550,783 A | 8/1996 | Stephens, Jr. et al. | 365/233 |
| 5,552,727 A | 9/1996 | Nakao | 327/159 |
| 5,555,429 A | 9/1996 | Parkinson et al. | 395/800 |
| 5,557,224 A | 9/1996 | Wright et al. | 327/115 |
| 5,557,781 A | 9/1996 | Stones et al. | 395/550 |
| 5,563,546 A | 10/1996 | Tsukada | 327/408 |
| 5,566,325 A | 10/1996 | Bruce, II et al. | 395/494 |
| 5,568,075 A | 10/1996 | Curran et al. | 327/172 |
| 5,568,077 A | 10/1996 | Sato et al. | 327/199 |
| 5,568,574 A | 10/1996 | Tanguay, Jr. et al. | 385/14 |
| 5,572,557 A | 11/1996 | Aoki | 375/376 |
| 5,572,722 A | 11/1996 | Vogley | 395/555 |
| 5,574,698 A | 11/1996 | Raad | 365/230.06 |
| 5,576,645 A | 11/1996 | Farwell | 327/94 |
| 5,577,079 A | 11/1996 | Zenno et al. | 375/373 |
| 5,577,220 A | 11/1996 | Combs et al. | 395/416 |
| 5,577,236 A | 11/1996 | Johnson et al. | 395/551 |
| 5,578,940 A | 11/1996 | Dillon et al. | 326/30 |
| 5,578,941 A | 11/1996 | Sher et al. | 326/34 |
| 5,579,326 A | 11/1996 | McClure | 371/61 |
| 5,581,197 A | 12/1996 | Motley et al. | 326/30 |
| 5,581,767 A | 12/1996 | Katsuki et al. | 395/800 |
| 5,589,788 A | 12/1996 | Goto | 327/276 |
| 5,590,073 A | 12/1996 | Arakawa et al. | 365/185.08 |
| 5,594,690 A | 1/1997 | Rothenberger et al. | 365/189.01 |
| 5,606,717 A | 2/1997 | Farmwald et al. | 395/856 |
| 5,608,264 A | 3/1997 | Gaul | 257/734 |
| 5,610,558 A | 3/1997 | Mittel et al. | 331/2 |
| 5,614,855 A | 3/1997 | Lee et al. | 327/158 |
| 5,619,473 A | 4/1997 | Hotta | 365/238.5 |
| 5,621,340 A | 4/1997 | Lee et al. | 327/65 |
| 5,621,690 A | 4/1997 | Jungroth et al. | 365/200 |
| 5,621,739 A | 4/1997 | Sine et al. | 371/22.1 |
| 5,623,523 A | 4/1997 | Gehrke | 375/376 |
| 5,623,534 A | 4/1997 | Desai et al. | 379/59 |
| 5,627,780 A | 5/1997 | Malhi | 365/185.09 |
| 5,627,791 A | 5/1997 | Wright et al. | 365/222 |
| 5,631,872 A | 5/1997 | Naritake et al. | 365/227 |
| 5,636,163 A | 6/1997 | Furatani et al. | 365/233 |
| 5,636,173 A | 6/1997 | Schaefer | 365/230.03 |
| 5,636,174 A | 6/1997 | Rao | 365/230.03 |
| 5,638,334 A | 6/1997 | Farmwald et al. | 365/230.03 |
| 5,638,335 A | 6/1997 | Akiyama et al. | 365/230.03 |
| 5,638,534 A | 6/1997 | Mote, Jr. | 395/485 |
| 5,644,743 A | 7/1997 | Barrett, Jr. et al. | 375/375 |
| 5,646,904 A | 7/1997 | Ohno et al. | 365/233 |
| 5,652,530 A | 7/1997 | Ashuri | 326/93 |
| 5,657,289 A | 8/1997 | Hush et al. | 365/230.05 |
| 5,657,481 A | 8/1997 | Farmwald et al. | 395/551 |
| 5,659,798 A | 8/1997 | Blumrich et al. | 395/846 |
| 5,663,921 A | 9/1997 | Pascucci et al. | 365/233 |
| 5,666,313 A | 9/1997 | Ichiguchi | 365/195 |
| 5,666,322 A | 9/1997 | Conkle | 365/233 |
| 5,668,763 A | 9/1997 | Fujioka et al. | 365/200 |
| 5,668,774 A | 9/1997 | Furatani | 365/233 |
| 5,673,005 A | 9/1997 | Pricer | 331/1 R |
| 5,675,274 A | 10/1997 | Kobayashi et al. | 327/158 |
| 5,675,588 A | 10/1997 | Maruyama et al. | 371/20.4 |
| 5,687,325 A | 11/1997 | Chang | 395/284 |
| 5,692,165 A | 11/1997 | Jeddeloh et al. | 395/551 |
| 5,694,065 A | 12/1997 | Hamasaki et al. | 327/108 |
| 5,706,224 A | 1/1998 | Srinivasan et al. | 365/49 |
| 5,708,611 A | 1/1998 | Iwamoto | 365/233 X |
| 5,710,733 A | 1/1998 | Chengson et al. | 365/52 |
| 5,712,580 A | 1/1998 | Baumgartner et al. | 327/12 |
| 5,712,883 A | 1/1998 | Miller et al. | 375/371 |
| 5,715,456 A | 2/1998 | Bennett et al. | 395/652 |
| 5,719,508 A | 2/1998 | Daly | 327/12 |
| 5,729,709 A | 3/1998 | Harness | 395/405 |
| 5,737,342 A | 4/1998 | Ziperovich | 371/25.1 |
| 5,740,123 A | 4/1998 | Uchida | 365/233 |
| 5,748,616 A | 5/1998 | Riley | 370/242 |
| 5,751,665 A | 5/1998 | Tanoi | 368/120 |
| 5,764,092 A | 6/1998 | Wada et al. | 327/271 |
| 5,767,715 A | 6/1998 | Marquis et al. | 327/159 |
| 5,768,177 A | 6/1998 | Sakuragi | 365/194 |
| 5,774,699 A | 6/1998 | Nagae | 395/551 |
| 5,778,214 A | 7/1998 | Taya et al. | 395/551 |
| 5,781,499 A | 7/1998 | Koshikawa | 365/233 |
| 5,784,422 A | 7/1998 | Heermann | 375/355 |
| 5,787,475 A | 7/1998 | Pawlowski | 711/137 |
| 5,789,947 A | 8/1998 | Sato | 327/3 |
| 5,790,612 A | 8/1998 | Chengson et al. | 375/373 |
| 5,794,020 A | 8/1998 | Tanaka et al. | 395/552 |
| 5,796,413 A | 8/1998 | Shipp et al. | 345/522 |
| 5,805,931 A | 9/1998 | Morzano et al. | 395/884 |
| 5,812,619 A | 9/1998 | Runaldue | 375/376 |
| 5,818,844 A | 10/1998 | Singh et al. | 370/463 |
| 5,818,984 A | 10/1998 | Ahmad et al. | 385/14 |
| 5,819,304 A | 10/1998 | Nilsen et al. | 711/5 |
| 5,822,255 A | 10/1998 | Uchida | 365/194 |
| 5,822,314 A | 10/1998 | Chater-Lea | 370/337 |
| 5,831,467 A | 11/1998 | Leung et al. | 327/319 |
| 5,831,545 A | 11/1998 | Murray et al. | 340/825.49 |
| 5,831,929 A | 11/1998 | Manning | 365/233 |
| 5,832,250 A | 11/1998 | Whittaker | 395/471 |
| 5,841,707 A | 11/1998 | Cline et al. | 365/194 |
| 5,852,378 A | 12/1998 | Keeth | 327/171 |
| 5,872,959 A | 2/1999 | Nguyen et al. | 395/552 |
| 5,875,352 A | 2/1999 | Gentry et al. | 395/843 |
| 5,875,454 A | 2/1999 | Craft et al. | 711/113 |
| 5,887,159 A | 3/1999 | Burrows | 395/567 |
| 5,889,828 A | 3/1999 | Miyashita et al. | 375/374 |
| 5,889,829 A | 3/1999 | Chiao et al. | 375/376 |
| 5,898,242 A | 4/1999 | Peterson | 327/278 |
| 5,898,674 A | 4/1999 | Mawhinney et al. | 370/247 |
| 5,909,130 A | 6/1999 | Martin et al. | 327/12 |
| 5,917,760 A | 6/1999 | Millar | 365/194 |
| 5,920,518 A | 7/1999 | Harrison et al. | 365/233 |
| 5,926,047 A | 7/1999 | Harrison | 327/159 |
| 5,926,436 A | 7/1999 | Toda et al. | 365/236 |
| 5,928,343 A | 7/1999 | Farmwald et al. | 710/104 |
| 5,940,608 A | 8/1999 | Manning | 395/551 |
| 5,940,609 A | 8/1999 | Harrison | 395/559 |
| 5,945,855 A | 8/1999 | Momtaz | 327/157 |
| 5,946,244 A | 8/1999 | Manning | 365/194 |
| 5,953,284 A | 9/1999 | Baker et al. | 365/233 |
| 5,953,386 A | 9/1999 | Anderson | 375/376 |
| 5,964,884 A | 10/1999 | Partovi et al. | 713/503 |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 5,990,719 A | 11/1999 | Dai et al. | 327/244 |
| 6,005,694 A | 12/1999 | Liu | 359/110 |
| 6,005,823 A | 12/1999 | Martin et al. | 365/230.08 |
| 6,011,732 A | 1/2000 | Harrison et al. | 365/194 |

| Patent No. | Kind | Date | Inventor | Class |
|---|---|---|---|---|
| 6,011,822 | A | 1/2000 | Dreyer | 375/376 |
| 6,014,042 | A | 1/2000 | Nguyen | 327/3 |
| 6,016,282 | A | 1/2000 | Keeth | 365/233 |
| 6,021,268 | A | 2/2000 | Johnson | 395/500.24 |
| 6,023,489 | A | 2/2000 | Hatch | 375/208 |
| 6,023,726 | A | 2/2000 | Saksena | 709/219 |
| 6,026,050 | A | 2/2000 | Baker et al. | 635/233 |
| 6,026,134 | A | 2/2000 | Duffy et al. | 375/376 |
| 6,026,226 | A | 2/2000 | Heile et al. | 395/500.13 |
| 6,029,250 | A | 2/2000 | Keeth | 713/400 |
| 6,031,241 | A | 2/2000 | Silfvast et al. | 250/504 R |
| 6,033,951 | A | 3/2000 | Chao | 438/253 |
| 6,038,219 | A | 3/2000 | Mawhinney et al. | 370/242 |
| 6,038,630 | A | 3/2000 | Foster et al. | 710/132 |
| 6,061,263 | A | 5/2000 | Boaz et al. | 365/51 |
| 6,061,296 | A | 5/2000 | Ternullo, Jr. et al. | 365/233 |
| 6,067,262 | A | 5/2000 | Irrinki et al. | 365/201 |
| 6,067,592 | A | 5/2000 | Farmwald et al. | 710/104 |
| 6,067,649 | A | 5/2000 | Goodwin | 714/718 |
| 6,072,802 | A | 6/2000 | Uhm et al. | 370/441 |
| 6,073,190 | A | 6/2000 | Rooney | 710/56 |
| 6,076,139 | A | 6/2000 | Welker et al. | 711/104 |
| 6,078,451 | A * | 6/2000 | Ioki | 360/51 |
| 6,079,008 | A | 6/2000 | Clery, III | 712/11 |
| 6,087,857 | A | 7/2000 | Wang | 327/5 |
| 6,088,774 | A | 7/2000 | Gillingham | 711/167 |
| 6,092,158 | A | 7/2000 | Harriman et al. | 711/151 |
| 6,098,158 | A | 8/2000 | Lay et al. | 711/162 |
| 6,101,151 | A | 8/2000 | Watanabe et al. | 365/233 |
| 6,101,152 | A | 8/2000 | Farmwald et al. | 365/233 |
| 6,101,197 | A | 8/2000 | Keeth et al. | 370/517 |
| 6,105,075 | A | 8/2000 | Ghaffari | 710/5 |
| 6,105,088 | A | 8/2000 | Pascale et al. | 710/100 |
| 6,105,157 | A | 8/2000 | Miller | 714/744 |
| 6,111,757 | A | 8/2000 | Dell et al. | 361/737 |
| 6,115,318 | A | 9/2000 | Keeth | 365/233 |
| 6,119,242 | A | 9/2000 | Harrison | 713/503 |
| 6,125,157 | A | 9/2000 | Donnelly et al. | 375/371 |
| 6,125,431 | A | 9/2000 | Kobayashi | 711/154 |
| 6,128,703 | A | 10/2000 | Bourekas et al. | 711/138 |
| 6,131,149 | A | 10/2000 | Lu et al. | 711/167 |
| 6,134,624 | A | 10/2000 | Burns et al. | 710/131 |
| 6,137,709 | A | 10/2000 | Boaz et al. | 365/51 |
| 6,144,587 | A | 11/2000 | Yoshida | 365/189.05 |
| 6,147,905 | A | 11/2000 | Seino | 365/185.11 |
| 6,147,916 | A | 11/2000 | Ogura | 365/203 |
| 6,150,889 | A | 11/2000 | Gulliver et al. | 331/14 |
| 6,160,423 | A | 12/2000 | Haq | 327/41 |
| 6,167,465 | A | 12/2000 | Parvin et al. | 710/22 |
| 6,167,486 | A | 12/2000 | Lee et al. | 711/120 |
| 6,173,432 | B1 | 1/2001 | Harrison | 716/1 |
| 6,175,571 | B1 | 1/2001 | Haddock et al. | 370/423 |
| 6,185,352 | B1 | 2/2001 | Hurley | 385/114 |
| 6,185,676 | B1 | 2/2001 | Poplingher et al. | 712/239 |
| 6,186,400 | B1 | 2/2001 | Dvorkis et al. | 235/462.45 |
| 6,191,663 | B1 | 2/2001 | Hannah | 333/17.3 |
| 6,194,917 | B1 | 2/2001 | Deng | 327/12 |
| 6,201,724 | B1 | 3/2001 | Ishizaki et al. | 365/49 |
| 6,208,180 | B1 | 3/2001 | Fisch et al. | 327/141 |
| 6,219,725 | B1 | 4/2001 | Diehl et al. | 710/26 |
| 6,223,301 | B1 | 4/2001 | Santeler et al. | 714/6 |
| 6,226,729 | B1 | 5/2001 | Stevens et al. | 711/171 |
| 6,229,712 | B1 | 5/2001 | Munoz-Bustamante et al. | 361/783 |
| 6,229,727 | B1 | 5/2001 | Doyle | 365/63 |
| 6,233,376 | B1 | 5/2001 | Updegrove | 385/14 |
| 6,243,769 | B1 | 6/2001 | Rooney | 710/56 |
| 6,243,831 | B1 | 6/2001 | Mustafa et al. | 714/24 |
| 6,246,618 | B1 | 6/2001 | Yamamoto et al. | 365/200 |
| 6,247,107 | B1 | 6/2001 | Christie | 711/216 |
| 6,249,802 | B1 | 6/2001 | Richardson et al. | 709/200 |
| 6,253,360 | B1 | 6/2001 | Yoshiba | 716/6 |
| 6,256,253 | B1 | 7/2001 | Oberlaender et al. | 365/230.02 |
| 6,256,692 | B1 | 7/2001 | Yoda et al. | 710/104 |
| 6,262,921 | B1 | 7/2001 | Manning | 365/194 |
| 6,266,730 | B1 | 7/2001 | Perino et al. | 710/126 |
| 6,269,451 | B1 | 7/2001 | Mullarkey | 713/401 |
| 6,272,609 | B1 | 8/2001 | Jeddeloh | 711/169 |
| 6,285,349 | B1 | 9/2001 | Smith | 345/147 |
| 6,285,726 | B1 | 9/2001 | Gaudet | 375/376 |
| 6,286,083 | B1 | 9/2001 | Chin et al. | 711/151 |
| 6,294,937 | B1 | 9/2001 | Crafts et al. | 327/158 |
| 6,295,328 | B1 | 9/2001 | Kim et al. | 375/376 |
| 6,298,450 | B1 | 10/2001 | Liu et al. | 713/502 |
| 6,301,637 | B1 | 10/2001 | Krull et al. | 711/112 |
| 6,327,196 | B1 | 12/2001 | Mullarkey | 365/194 |
| 6,327,318 | B1 | 12/2001 | Bhullar et al. | 375/374 |
| 6,327,642 | B1 | 12/2001 | Lee et al. | 711/120 |
| 6,330,205 | B2 | 12/2001 | Shimizu et al. | 365/230.06 |
| 6,338,127 | B1 | 1/2002 | Manning | 711/167 |
| 6,344,664 | B1 | 2/2002 | Trezza et al. | 257/82 |
| 6,347,055 | B1 | 2/2002 | Motomura | 365/189.05 |
| 6,349,363 | B2 | 2/2002 | Cai et al. | 711/129 |
| 6,356,573 | B1 | 3/2002 | Jonsson et al. | 372/46 |
| 6,366,375 | B1 | 4/2002 | Sakai et al. | 359/115 |
| 6,367,074 | B1 | 4/2002 | Bates et al. | 717/11 |
| 6,370,068 | B2 | 4/2002 | Rhee | 365/196 |
| 6,370,611 | B1 | 4/2002 | Callison et al. | 711/105 |
| 6,373,777 | B1 | 4/2002 | Suzuki | 365/230.03 |
| 6,377,646 | B1 | 4/2002 | Sha | 375/376 |
| 6,378,079 | B1 | 4/2002 | Mullarkey | 713/401 |
| 6,381,190 | B1 | 4/2002 | Shinkai | 365/230.03 |
| 6,389,514 | B1 | 5/2002 | Rokicki | 711/136 |
| 6,392,653 | B1 | 5/2002 | Malandain et al. | 345/501 |
| 6,401,213 | B1 | 6/2002 | Jeddeloh | 713/401 |
| 6,405,273 | B1 | 6/2002 | Fleck et al. | 710/131 |
| 6,405,280 | B1 | 6/2002 | Ryan | 711/105 |
| 6,421,744 | B1 | 7/2002 | Morrison et al. | 710/22 |
| 6,430,696 | B1 | 8/2002 | Keeth | 713/503 |
| 6,433,785 | B1 | 8/2002 | Garcia et al. | 345/531 |
| 6,434,639 | B1 | 8/2002 | Haghighi | 710/39 |
| 6,434,654 | B1 | 8/2002 | Story et al. | 710/307 |
| 6,434,696 | B1 | 8/2002 | Kang | 713/2 |
| 6,434,736 | B1 | 8/2002 | Schaecher et al. | 716/17 |
| 6,438,043 | B2 | 8/2002 | Gans et al. | 365/194 |
| 6,438,622 | B1 | 8/2002 | Haghighi et al. | 710/1 |
| 6,438,668 | B1 | 8/2002 | Esfahani et al. | 711/165 |
| 6,442,644 | B1 | 8/2002 | Gustavson et al. | 711/105 |
| 6,449,308 | B1 | 9/2002 | Knight, Jr. et al. | 375/212 |
| 6,453,393 | B1 | 9/2002 | Holman et al. | 711/154 |
| 6,457,116 | B1 | 9/2002 | Mirsky et al. | 712/16 |
| 6,460,114 | B1 | 10/2002 | Jeddeloh | 711/120 |
| 6,462,978 | B2 | 10/2002 | Shibata et al. | 365/63 |
| 6,463,059 | B1 | 10/2002 | Movshovich et al. | 370/389 |
| 6,470,422 | B2 | 10/2002 | Cai et al. | 711/129 |
| 6,473,828 | B1 | 10/2002 | Matsui | 711/104 |
| 6,473,871 | B1 | 10/2002 | Coyle et al. | 714/715 |
| 6,477,592 | B1 | 11/2002 | Chen et al. | 710/52 |
| 6,477,614 | B1 | 11/2002 | Leddige et al. | 711/5 |
| 6,477,621 | B1 | 11/2002 | Lee et al. | 711/120 |
| 6,479,322 | B1 | 11/2002 | Kawata et al. | 438/109 |
| 6,484,244 | B1 | 11/2002 | Manning | 711/154 |
| 6,487,556 | B1 | 11/2002 | Downs et al. | 707/101 |
| 6,490,188 | B2 | 12/2002 | Nuxoll et al. | 365/63 |
| 6,493,320 | B1 | 12/2002 | Schober et al. | 370/241 |
| 6,493,784 | B1 | 12/2002 | Kamimura et al. | 710/309 |
| 6,493,803 | B1 | 12/2002 | Pham et al. | 711/147 |
| 6,496,193 | B1 | 12/2002 | Surti et al. | 345/552 |
| 6,496,909 | B1 | 12/2002 | Schimmel | 711/163 |
| 6,499,111 | B2 | 12/2002 | Mullarkey | 713/401 |
| 6,501,471 | B1 | 12/2002 | Venkataraman et al. | 345/424 |
| 6,502,161 | B1 | 12/2002 | Perego et al. | 711/5 |
| 6,502,212 | B1 | 12/2002 | Coyle et al. | 714/43 |
| 6,505,287 | B2 | 1/2003 | Uematsu | 711/170 |
| 6,507,899 | B1 | 1/2003 | Oberlaender et al. | 711/169 |
| 6,523,092 | B1 | 2/2003 | Fanning | 711/134 |

| Patent No. | Date | Inventor | Class |
|---|---|---|---|
| 6,523,093 B1 | 2/2003 | Bogin et al. | 711/137 |
| 6,526,111 B1 | 2/2003 | Prasad | 375/376 |
| 6,526,483 B1 | 2/2003 | Cho et al. | 711/154 |
| 6,526,498 B1 | 2/2003 | Mirsky et al. | 712/11 |
| 6,539,490 B1 | 3/2003 | Forbes et al. | 713/401 |
| 6,552,304 B1 | 4/2003 | Hirose et al. | 219/216 |
| 6,552,564 B1 | 4/2003 | Forbes et al. | 326/30 |
| 6,553,479 B2 | 4/2003 | Mirsky et al. | 712/16 |
| 6,564,329 B1 | 5/2003 | Cheung et al. | 713/322 |
| 6,570,429 B1 | 5/2003 | Hellriegel | 327/295 |
| 6,580,531 B1 | 6/2003 | Swanson et al. | 359/110 |
| 6,584,543 B2 | 6/2003 | Williams et al. | 711/105 |
| 6,587,912 B2 | 7/2003 | Leddige et al. | 711/5 |
| 6,590,816 B2 | 7/2003 | Perner | 365/200 |
| 6,594,713 B1 | 7/2003 | Fuoco et al. | 710/31 |
| 6,594,722 B1 | 7/2003 | Willke, II et al. | 710/313 |
| 6,598,154 B1 | 7/2003 | Vaid et al. | 712/237 |
| 6,599,031 B2 | 7/2003 | Li | 385/88 |
| 6,615,325 B2 | 9/2003 | Mailloux et al. | 711/154 |
| 6,622,227 B2 | 9/2003 | Zumkehr et al. | 711/167 |
| 6,628,294 B1 | 9/2003 | Sadowsky et al. | 345/568 |
| 6,629,220 B1 | 9/2003 | Dyer | 711/158 |
| 6,631,440 B2 | 10/2003 | Jenne et al. | 711/105 |
| 6,636,110 B1 | 10/2003 | Ooishi et al. | 327/565 |
| 6,636,957 B2 | 10/2003 | Stevens et al. | 711/171 |
| 6,643,787 B1 * | 11/2003 | Zerbe et al. | 713/400 |
| 6,646,929 B1 | 11/2003 | Moss et al. | 365/194 |
| 6,647,470 B1 | 11/2003 | Janzen | 711/154 |
| 6,651,139 B1 | 11/2003 | Ozeki et al. | 711/118 |
| 6,658,509 B1 | 12/2003 | Bonella et al. | 710/100 |
| 6,661,943 B2 | 12/2003 | Li | 385/18 |
| 6,662,304 B2 | 12/2003 | Keeth et al. | 713/400 |
| 6,665,202 B2 | 12/2003 | Lindahl et al. | 365/49 |
| 6,665,222 B2 | 12/2003 | Wright et al. | 365/203 |
| 6,667,895 B2 | 12/2003 | Jang et al. | 365/63 |
| 6,681,292 B2 | 1/2004 | Creta et al. | 711/119 |
| 6,694,496 B2 | 2/2004 | Goslin et al. | 716/4 |
| 6,697,926 B2 | 2/2004 | Johnson et al. | 711/167 |
| 6,707,726 B2 * | 3/2004 | Nishio et al. | 365/189.12 |
| 6,715,018 B2 | 3/2004 | Farnworth et al. | 710/300 |
| 6,718,440 B2 | 4/2004 | Maiyuran et al. | 711/137 |
| 6,721,187 B2 | 4/2004 | Hall et al. | 361/760 |
| 6,721,195 B2 | 4/2004 | Brunelle et al. | 365/63 |
| 6,724,685 B2 | 4/2004 | Braun et al. | 365/233 |
| 6,728,800 B1 | 4/2004 | Lee et al. | 710/54 |
| 6,735,679 B1 | 5/2004 | Herbst et al. | 711/167 |
| 6,735,682 B2 | 5/2004 | Segelken et al. | 711/220 |
| 6,745,275 B2 | 6/2004 | Chang | 710/305 |
| 6,751,113 B2 | 6/2004 | Bhakta et al. | 365/63 |
| 6,751,703 B2 | 6/2004 | Chilton | 711/113 |
| 6,751,722 B2 | 6/2004 | Mirsky et al. | 712/15 |
| 6,752,539 B2 | 6/2004 | Colgan et al. | 385/92 |
| 6,754,117 B2 | 6/2004 | Jeddeloh | 365/201 |
| 6,754,812 B1 | 6/2004 | Abdallah et al. | 712/234 |
| 6,756,661 B2 | 6/2004 | Tsuneda et al. | 257/673 |
| 6,760,833 B1 | 7/2004 | Dowling | 712/34 |
| 6,771,538 B2 | 8/2004 | Shukuri et al. | 365/185.05 |
| 6,772,261 B1 | 8/2004 | D'Antonio et al. | 710/301 |
| 6,775,747 B2 | 8/2004 | Venkatraman | 711/137 |
| 6,785,780 B1 | 8/2004 | Klein et al. | 711/148 |
| 6,789,173 B1 | 9/2004 | Tanaka et al. | 711/147 |
| 6,792,059 B2 | 9/2004 | Yuan et al. | 375/354 |
| 6,792,496 B2 | 9/2004 | Aboulenein et al. | 710/306 |
| 6,793,408 B2 | 9/2004 | Levy et al. | 385/88 |
| 6,795,899 B2 | 9/2004 | Dodd et al. | 711/137 |
| 6,799,246 B1 | 9/2004 | Wise et al. | 711/117 |
| 6,799,268 B1 | 9/2004 | Boggs et al. | 712/228 |
| 6,804,760 B2 | 10/2004 | Wiliams | 711/170 |
| 6,804,764 B2 | 10/2004 | LaBerge et al. | 711/170 |
| 6,807,630 B2 | 10/2004 | Lay et al. | 713/2 |
| 6,809,555 B1 | 10/2004 | Nguyen | 327/3 |
| 6,811,320 B1 | 11/2004 | Abbott | 385/58 |
| 6,816,931 B2 * | 11/2004 | Shih | 710/62 |
| 6,816,947 B1 | 11/2004 | Huffman | 711/151 |
| 6,816,987 B1 | 11/2004 | Olson et al. | 714/704 |
| 6,820,181 B2 | 11/2004 | Jeddeloh et al. | 711/169 |
| 6,821,029 B1 | 11/2004 | Grung et al. | 385/92 |
| 6,823,023 B1 | 11/2004 | Hannah | 375/296 |
| 6,845,409 B1 | 1/2005 | Talagala et al. | 710/20 |
| 6,889,304 B2 | 5/2005 | Perego et al. | 711/170 |
| 6,910,109 B2 | 6/2005 | Holman et al. | 711/156 |
| 6,910,146 B2 | 6/2005 | Dow | 713/500 |
| 6,950,956 B2 | 9/2005 | Zerbe et al. | 713/400 |
| 6,956,996 B2 | 10/2005 | Gordon et al. | 385/48 |
| 6,961,259 B2 | 11/2005 | Lee et al. | 365/63 |
| 6,980,824 B2 | 12/2005 | Hsu et al. | 455/522 |
| 6,982,892 B2 | 1/2006 | Lee et al. | 365/63 |
| 7,000,062 B2 | 2/2006 | Perego et al. | 711/5 |
| 7,016,213 B2 | 3/2006 | Reeves et al. | 365/63 |
| 7,016,606 B2 | 3/2006 | Cai et al. | 398/27 |
| 7,024,547 B2 | 4/2006 | Kartoz | 713/1 |
| 7,035,212 B1 | 4/2006 | Mittal et al. | 370/230 |
| 7,047,351 B2 | 5/2006 | Jeddeloh | 711/5 |
| 7,062,595 B2 * | 6/2006 | Lindsay et al. | 710/315 |
| 7,106,973 B2 | 9/2006 | Kube et al. | 398/164 |
| 7,120,727 B2 | 10/2006 | Lee et al. | 711/5 |
| 2001/0023474 A1 | 9/2001 | Kyozuka et al. | 711/114 |
| 2001/0034839 A1 | 10/2001 | Karjoth et al. | 713/190 |
| 2001/0039612 A1 | 11/2001 | Lee | 713/2 |
| 2002/0038412 A1 | 3/2002 | Nizar et al. | 711/170 |
| 2002/0112119 A1 | 8/2002 | Halbert et al. | 711/115 |
| 2002/0116588 A1 | 8/2002 | Beckert et al. | 711/161 |
| 2002/0144064 A1 | 10/2002 | Fanning | 711/144 |
| 2002/0178319 A1 | 11/2002 | Sanchez-Olea | 710/305 |
| 2003/0005223 A1 | 1/2003 | Coulson et al. | 711/118 |
| 2003/0043158 A1 | 3/2003 | Wasserman et al. | 345/545 |
| 2003/0043426 A1 | 3/2003 | Baker et al. | 359/109 |
| 2003/0093630 A1 | 5/2003 | Richard et al. | 711/154 |
| 2003/0110368 A1 | 6/2003 | Kartoz | 713/1 |
| 2003/0149809 A1 | 8/2003 | Jensen et al. | 710/22 |
| 2003/0163649 A1 | 8/2003 | Kapur et al. | 711/146 |
| 2003/0177320 A1 | 9/2003 | Sah et al. | 711/158 |
| 2003/0193927 A1 | 10/2003 | Hronik | 370/351 |
| 2003/0217223 A1 | 11/2003 | Nino, Jr. et al. | 711/105 |
| 2003/0227798 A1 | 12/2003 | Pax | 365/189.12 |
| 2003/0229734 A1 * | 12/2003 | Chang et al. | 710/36 |
| 2003/0229762 A1 | 12/2003 | Maiyuran et al. | 711/137 |
| 2003/0229770 A1 | 12/2003 | Jeddeloh | 711/213 |
| 2004/0022094 A1 | 2/2004 | Radhakrishnan et al. | 365/200 |
| 2004/0024959 A1 | 2/2004 | Taylor | 711/105 |
| 2004/0028412 A1 | 2/2004 | Murphy | 398/135 |
| 2004/0044833 A1 | 3/2004 | Ryan | 711/5 |
| 2004/0047169 A1 | 3/2004 | Lee et al. | 365/63 |
| 2004/0064602 A1 | 4/2004 | George | 710/22 |
| 2004/0123088 A1 | 6/2004 | Poisner et al. | 713/1 |
| 2004/0126115 A1 | 7/2004 | Levy et al. | 398/116 |
| 2004/0128421 A1 | 7/2004 | Forbes | 710/303 |
| 2004/0144994 A1 | 7/2004 | Lee et al. | 257/200 |
| 2004/0148482 A1 | 7/2004 | Grundy et al. | 711/167 |
| 2004/0230718 A1 | 11/2004 | Polzin et al. | 710/22 |
| 2004/0236885 A1 | 11/2004 | Fredriksson et al. | 710/100 |
| 2004/0251929 A1 | 12/2004 | Pax et al. | 326/30 |
| 2004/0257890 A1 | 12/2004 | Lee et al. | 365/200 |
| 2004/0268009 A1 | 12/2004 | Shin et al. | 710/310 |
| 2005/0030797 A1 | 2/2005 | Pax et al. | 365/189.12 |
| 2005/0044304 A1 | 2/2005 | James | 711/105 |
| 2005/0044327 A1 | 2/2005 | Howard et al. | 711/147 |
| 2005/0071542 A1 | 3/2005 | Weber et al. | 711/105 |
| 2005/0105350 A1 | 5/2005 | Zimmerman | 365/201 |
| 2005/0162882 A1 | 7/2005 | Reeves et al. | 365/63 |
| 2005/0177690 A1 | 8/2005 | LaBerge | 711/154 |
| 2005/0210185 A1 | 9/2005 | Renick | 711/105 |
| 2005/0210216 A1 | 9/2005 | Jobs et al. | 711/170 |
| 2005/0216648 A1 | 9/2005 | Jeddeloh | 710/311 |
| 2005/0228939 A1 | 10/2005 | Janzen | 711/105 |
| 2005/0257021 A1 | 11/2005 | James | 711/170 |

| | | | |
|---|---|---|---|
| 2005/0268060 | A1 | 12/2005 | Cronin et al. ............... 711/167 |
| 2006/0023528 | A1 | 2/2006 | Pax et al. .................... 365/202 |
| 2006/0047891 | A1 | 3/2006 | James et al. ............... 711/105 |

FOREIGN PATENT DOCUMENTS

| | | |
|---|---|---|
| EP | 0 295 515 A1 | 12/1988 |
| EP | 0 406 786 A1 | 1/1991 |
| EP | 0 450 871 A2 | 10/1991 |
| EP | 0 476 585 A3 | 3/1992 |
| EP | 0 655 741 A2 | 5/1995 |
| EP | 0 655 834 A1 | 5/1995 |
| EP | 0 680 049 A2 | 11/1995 |
| EP | 0 703 663 A1 | 3/1996 |
| EP | 0 704 848 A3 | 4/1996 |
| EP | 0 704 975 A1 | 4/1996 |
| EP | 0 767 538 A1 | 4/1997 |
| EP | 0849685 A2 | 6/1998 |
| GB | 2288066 A | 10/1995 |
| JP | 6-1237512 | 10/1986 |
| JP | 2-112317 | 4/1990 |
| JP | 4-135311 | 5/1992 |
| JP | 5-136664 | 6/1993 |
| JP | 5-282868 | 10/1993 |
| JP | 0-7319577 | 12/1995 |
| JP | 2001265539 A | 9/2001 |
| WO | WO 93/19422 | 9/1993 |
| WO | WO 94/29871 | 12/1994 |
| WO | WO 95/22200 | 8/1995 |
| WO | WO 95/22206 | 8/1995 |
| WO | WO 96/10866 | 4/1996 |
| WO | WO 97/14289 | 4/1997 |
| WO | WO 97/42557 | 11/1997 |
| WO | WO 02/27499 A2 | 4/2002 |

OTHER PUBLICATIONS

Gillett, R. et al., "*Using The Memory Channel Network*", Micro IEEE, vol. 17, Issue 1, Jan.-Feb. 1997 (Abstract Only).

Gommans et al., "*Applications Drive Secure Lightpath Creation Across Heterogeneous Domains*", Communications Magazine, IEEE, vol. 44, Issue 3, Mar. 2006 (Abstract Only).

Intel, "Flash Memory PCI Add-In Card for Embedded Systems", Application Note AP-758, Sep. 1997, pp. i-13.

Intel, "Intel 840 Chipset: 82840 Memory Controller Hub (MCH)", Datasheet, www.intel.com/design/chipsets/datashts/298020.htm, Oct. 1999, pp. 1-178.

Micron Technology, Inc., "Synchronous DRAM Module 512MB/1GB (x72, ECC) 168-PIN Registered FBGA SDRAM DIMM", Micron Technology, Inc., 2002, pp. 1-23.

Shanley, T. et al., "PCI System Architecture", Third Edition, Mindshare, Inc., 1995, pp. 24-25.

Depari, A. et al., "*USB Sensor Network For Industrial Applications*", IEEE XPLORE, May 2004 (Abstract Only).

Hsieh et al., "*On The Design Of A Local Switch For Heterogenous Multi-subsystem Interconnected*", IEEE XPLORE, Oct. 1993 (Abstract Only).

Alvarez, J. et al. "A Wide-Bandwidth Low Voltage PLL for PowerPC™ Microprocessors" IEEE IEICE Trans. Electron., vol. E-78. No. 6, Jun. 1995, pp. 631-639.

Anonymous, "400MHz SLDRAM, 4M X 16 SLDRAM Pipelined, Eight Bank, 2.5 V Operation," SLDRAM Consortium Advance Sheet, published throughtout the United States, Jan. 1997, pp.1-22.

Anonymous, "Draft Standard for a High-Speed Memory Interface (SyncLink)", Microprocessor and Microcomputer Standards Subcommittee of the IEEE Computer Society, Copyright 1996 by the Institute of Electrical and Electronics Engineers, Inc., New York, NY, pp. 1-56.

Anonymous, "Programmable Pulse Generator", IBM Technical Disclosure Bulletin, vol. 17, No. 12, May 1975, pp. 3553-3554.

Arai, Y. et al., "A Time Digitizer CMOS Gate-Array with a 250 ps Time Resolution", XP000597207, IEEE Journal of Solid-State Circuits, vol. 31, No. 2, Feb. 1996, pp. 212-220.

Anonymous, "Pulse Combining Network", IBM Technical Disclosure Bulletin, vol. 32, No. 12, May 1990, pp. 149-151.

Anonymous, "Variable Delay Digital Circuit", IBM Technical Disclosure Bulletin, vol. 35, No. 4A, Sep. 1992, pp. 365-366.

Arai, Y. et al., "A CMOS Four Channel x 1K Time Memory LSI with 1-ns/b Resolution", IEEE Journal of Solid-State Circuits, vol. 27, No. 3, M, 8107 Mar. 1992, No. 3, New York, US, pp. 59-364 and pp. 528-531.

Aviram, A. et al., "Obtaining High Speed Printing on Thermal Sensitive Special Paper With a Resistive Ribbon Print Head", IBM Technical Disclosure Bulletin, vol. 27, No. 5, Oct. 1984, pp. 3059-3060.

Bazes, M., "Two Novel Fully Complementary Self-Biased CMOS Differential Amplifiers", IEEE Journal of Solid-State Circuits, vol. 26, No. 2, Feb. 1991, pp. 165-168.

Chapman, J. et al., "Low-Cost High-Performance CMOS Timing Vernier for ATE", IEEE International Test Conference, Paper 21.2, 1995, pp. 459-468.

Cho, J. "Digitally-Controlled PLL with Pulse Width Detection Mechanism for Error Correction", ISSCC 1997, Paper No. SA 20.3, pp. 334-335.

Christiansen, J., "An Integrated High Resolution CMOS Timing Generator Based on an Array of Delay Locked Loops", IEEE Journal of Solid-State Circuits, vol. 31, No. 7, Jul. 1996, pp. 952-957.

Combes, M. et al., "A Portable Clock Multiplier Generator Using Digital CMOS Standard Cells", IEEE Journal of Solid-State Circuits, vol. 31, No. 7, Jul. 1996, pp. 958-965.

Donnelly, K. et al., "A 660 MB/s Interface Megacell Portable Circuit in 0.3 μm-0.7 μm CMOS ASIC", IEEE Journal of Solid-State Circuits, vol. 31, No. 12, Dec. 1996, pp. 1995-2001.

Goto, J. et al., "A PLL-Based Programmable Clock Generator with 50- to 350-MHz Oscillating Range for Video Signal Processors", IEICE Trans. Electron., vol. E77-C, No. 12, Dec. 1994, pp. 1951-1956.

Gustavsion, David B., et al., "IEEE Standard for Scalable Coherent Interface (SCI)," IEEE Computer Society, IEEE Std. 1596-1992, Aug. 2, 1993.

Hamamoto, T., "400-MHz Random Column Operating SDRAM Techniques with Self-Skew Compensation", IEEE Journal of Solid-State Circuits, vol. 33, No. 5, May 1998, pp. 770-778.

Ishibashi, A. et al., "High-Speed Clock Distribution Architecture Employing PLL for 0.6μm CMOS SOG", IEEE Custom Integrated Circuits Conference, 1992, pp. 27.6.1-27.6.4.

Kim, B. et al., "A 30MHz High-Speed Analog/Digital PLL in 2μm CMOS", ISSCC, Feb. 1990, two pages.

Kikuchi, S. et al., "A Gate-Array-Based 666MHz VLSI Test System", IEEE International Test Conference, Paper 21.1, 1995, pp. 451-458.

Ko, U. et al., "A 30-ps Jitter, 3.6-μs Locking, 3.3-Volt Digital PLL for CMOS Gate Arrays", IEEE Custom Integrated Circuits Conference, 1993, pp. 23.3.1-23.3.4.

Lee, T. et al., "A 2.5V Delay-Locked Loop for an 18Mb 500MB/s DRAM", IEEE International Solid-State Circuits Conference Digest of Technical Papers, Paper No. FA 18.6, 1994, pp. 300-301.

Lesmeister, G., "A Densely Integrated High Performance CMOS Tester", International Test Conference, Paper 16.2, 1991, pp. 426-429.

Ljuslin, C. et al., "An Integrated 16-channel CMOS Time to Digital Converter", IEEE Nuclear Science Symposium & Medical Imaging Conference Record, vol. 1, 1993, pp. 625-629.

Maneatis, J., "Low-Jitter Process-Independent DLL and PLL Based on Self-Biased Techniques", IEEE Journal of Solid-State Circuits, vol. 31, No. 11, Nov. 1996, pp. 1723-1732.

Nakamura, M. et al., "A 156 Mbps CMOS Clock Recovery Circuit for Burst-mode Transmission", Symposium on VLSI Circuits Digest of Technical Papers, 1996, pp. 122-123.

Nielson, E., "Inverting latches make simple VCO", EDN, Jun. 19, 1997, five pages.

Novof, I. et al., "Fully Integrated CMOS Phase-Locked Loop with 15 to 240 MHz Locking Range and ±50 ps Jitter", IEEE Journal of Solid-State Circuits, vol. 30, No. 11, Nov. 1995, pp. 1259-1266.

Park, D. et al., "Fast Acquisition Frequency Synthesizer with the Multiple Phase Detectors", IEEE Pacific Rim Conference on Communications, Computers and Signal Processing, vol. 2, May 1991. pp. 665-668.

Saeki, T. et al., "A 2.5-ns Clock Access, 250-MHz, 256-Mb SDRAM with Synchronous Mirror Delay", IEEE Journal of Solid-State Circuits, vol. 31, No. 11, Nov. 1996, pp. 1656-1665.

Santos, D. et al., "A CMOS Delay Locked Loop And Sub-Nanosecond Time-to-Digital Converter Chip", IEEE Nuclear Science Symposium and Medical Imaging Conference Record, vol. 1, Oct. 1995, pp. 289-291.

Shirotori, T. et al., "PLL-based, Impedance Controlled Output Buffer", 1991 Symposium on VLSI Circuits Digest of Technical Papers, pp. 49-50.

Sidiropoulos, S. et al., "A 700-Mb/s/pin CMOS Signaling Interface Using Current Integrating Receivers", IEEE Journal of Solid-State Circuits, vol. 32, No. 5, May 1997, pp. 681-690.

Sidiropoulos, S. et al., "A CMOS 500 Mbps/pin synchronous point to point link interface", IEEE Symposium on VLSI Circuits Digest of Technical Papers, 1994, pp. 43-44.

Sidiropoulos, S. et al., "A Semi-Digital DLL with Unlimited Phase Shift Capability and 0.08-400MHz Operating Range," IEEE International Solid State Circuits Conference, Feb. 8, 1997, pp. 332-333.

Soyuer, M. et al., "A Fully Monolithic 1.25GHz CMOS Frequency Synthesizer", IEEE Symposium on VLSI Circuits Digest of Technical Papers, 1994, pp. 127-128.

Taguchi, M. et al., "A 40-ns 64-Mb DRAM with 64-b Parallel Data Bus Architecture", IEEE Journal of Solid-State Circuits, vol. 26, No. 11, Nov. 1991, pp. 1493-1497.

Tanoi, S. et al., "A 250-622 MHz Deskew and Jitter-Suppressed Clock Buffer Using a Frequency- and Delay-Locked Two-Loop Architecture", 1995 Symposium on VLSI Circuits Digest of Technical Papers, vol. 11, No. 2, pp. 85-86.

Tanoi, S. et al., "A 250-622 MHz Deskew and Jitter-Suppressed Clock Buffer Using Two-Loop Architecture", IEEE IEICE Trans. Electron., vol. E-79-C. No. 7, Jul. 1996, pp.898-904.

von Kaenel, V. et al., "A 320 MHz, 1.5 mW @ 1.35 V CMOS PLL for Microprocessor Clock Generation", IEEE Journal of Solid-State Circuits, vol. 31, No. 11, Nov. 1996, pp. 1715-1722.

Watson, R. et al., "Clock Buffer Chip with Absolute Delay Regulation Over Process and Environmental Variations", IEEE Custom Integrated Circuits Conference, 1992, pp. 25.2.1-25.2.5.

Yoshimura, T. et al., "A 622-Mb/s Bit/Frame Synchronizer for High-Speed Backplane Data Communication", IEEE Journal of Solid-State Circuits, vol. 31, No. 7, Jul. 1996, pp. 1063-1066.

Gillingham, Peter, "*SLDRAM Architectural and Functional Overview*", 1997 SLDRAM Consortium, Aug. 29, 1997, pp. 1-14.

Omkar et al., "*Neural Network Controller for Minimizing Hub Shear Forces in Helicopter*", IEEE XPLORE, Sep. 1998 (Abstract Only).

Scott, Noel D. et al., "An Overview of the Visualize fx Graphics Accelerator Hardware," The Hewlett-Packard Journal, Article 4, May 1998, pp. 28-34.

\* cited by examiner

SYSTEM AND METHOD FOR USING A LEARNING SEQUENCE TO ESTABLISH COMMUNICATIONS ON A HIGH-SPEED NONSYNCHRONOUS INTERFACE IN THE ABSENCE OF CLOCK FORWARDING

CROSS-REFERENCE TO RELATED APPLICATION

This application is a continuation of pending U.S. patent application Ser. No. 10/695,383, filed Oct. 27, 2003.

TECHNICAL FIELD

The present invention relates to a processor-based system, and more particularly, to a processor-based system having a memory module with a memory hub coupling several memory devices to a processor or other memory access device.

BACKGROUND OF THE INVENTION

Processor-based systems, such as computer systems, use memory devices, such as dynamic random access memory ("DRAM") devices, as system memory to store instructions and data that are accessed by a processor. In a typical computer system, the processor communicates with the system memory through a processor bus and a memory controller. The processor issues a memory request, which includes a memory command, such as a read command, and an address designating the location from which data or instructions are to be read or to which data or instructions are to be written. The memory controller uses the command and address to generate appropriate command signals as well as row and column addresses, which are applied to the system memory. In response to the commands and addresses, data is transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

One approach to increasing the data bandwidth to and from memory devices is to use multiple memory devices coupled to the processor through a memory hub as shown in FIG. 1. A computer system 10 using a memory hub architecture includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, is typically static random access memory ("SRAM"). Finally, the processor bus 106 is coupled to a system controller 110, which is also sometimes referred to as a bus bridge.

The system controller 110 contains a memory hub controller 112 that is coupled to the processor 104. The memory hub controller 112 is also coupled to several memory modules 114a-n through a bus system 115. Each of the memory modules 114a-n includes a memory hub 116 coupled to several memory devices 118 through command, address and data buses 117. The memory hub 116 efficiently routes memory requests and responses between the controller 112 and the memory devices 118. Computer systems employing this architecture can have a higher bandwidth because the processor 104 can access one memory module 114a-n while another memory module 114a-n is responding to a prior memory access. For example, the processor 104 can output write data to one of the memory modules 114a-n in the system while another memory module 114a-n in the system is preparing to provide read data to the processor 104. The operating efficiency of computer systems using a memory hub architecture can make it more practical to vastly increase data bandwidth of a memory system. A memory hub architecture can also provide greatly increased memory capacity in computer systems.

The system controller 110 also serves as a communications path to the processor 104 for a variety of other components. More specifically, the system controller 110 includes a graphics port that is typically coupled to a graphics controller 116, which is, in turn, coupled to a video terminal 118. The system controller 110 is also coupled to one or more input devices 120, such as a keyboard or a mouse, to allow an operator to interface with the computer system 10. Typically, the computer system 10 also includes one or more output devices 122, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

Although there are advantages to utilizing a memory hub for accessing memory devices, the design of the hub memory system, and more generally, computer systems including such a memory hub architecture, becomes increasingly difficult. For example, the memory modules 114a-n each operates internally in a synchronous manner so that the command, address, and data signals transferred to the memory module 114a-n are normally latched or strobed into the memory modules 114a-n by a clock signal. However, operations between memory modules 114a-n are asynchronous. As transfer rates increase, the time during which the command, address and data signals as received at the memory hubs 116 are valid decreases. This period during which the signals are valid is commonly referenced by those ordinarily skilled in the art as the "window" or "eye." Not only does the size of the eye for command, address, and data signals decrease, but the time or location of the eye can also vary because of various factors, such as timing skew, voltage and current drive capability, and the like. In the case of timing skew of signals, it often arises from a variety of timing errors such as loading on the lines of the bus and the physical lengths of such lines.

As the size of signal eyes decrease at higher transfer rates, the variations in the location of the signal eyes become more of a problem. One technique to alleviate this problem to some extent is to couple a clock to the memory modules, a technique known as clock forwarding. As shown in FIG. 1, a clock generator 500 generates a clock signal CLK and couples it to the memory hub controller 112 and each of the memory hubs 116 in respective memory modules 114a-n. The memory hubs 116 in respective memory modules 114 a-n also receive command, address and data signals from the memory hub controller 112 that are coupled through the bus system 115. The CLK signal is coupled from the clock generator 500 in synchronism with the command, address and data signals so it, in theory, should be usable by the memory hubs 116 to define the eye during for the command, address and data signals as they are received at the memory hubs 116. However, in practice, even this approach becomes ineffective as signal transfer rates continue to decrease. In particular, the CLK signal may be subject to different conditions than the command, address and data signals, such as being coupled through a physically different signal path or being loaded to a greater degree. Also, for the clock forwarding techniques used in the computer system 10 to successfully function at higher clock speeds, the layout of conductors between the memory hub controller 112 and the memory hubs 116 must be precisely controlled.

One technique that has been proposed to allow the CLK signal to continue being used to strobe command, address and data signals at higher transfer rates is to include circuitry (not shown) in the memory hubs 116 that adjusts the timing of the CLK signal within each of the hubs 116 so that it is aligned with the signal eye. However, this technique adds a fair degree of complexity to the memory hubs 116 and is not always effective.

There is therefore a need for a system and method that allows command, address and data signals to be coupled between a memory hub controller and one or more memory hubs in respective memory modules that avoids problems of synchronizing a clock signal coupled between the memory hub controller and memory hubs along with the command, address, and data signals.

SUMMARY OF THE INVENTION

A memory hub controller is coupled to a memory module having a memory hub and a plurality of memory devices. The memory hub controller communicates with the memory module through an upstream data bus and a downstream data bus. The memory hub controller includes a receiver coupled to the upstream data bus and a transmitter coupled to the downstream data bus. The memory module includes a receiver coupled to the downstream data bus and a transmitter coupled to the upstream data bus. Each of the transmitters is operable in an initialization mode to generate an expected data pattern and to repeatedly couple the generated data pattern to the data bus to which it is coupled. Each of the receivers is operable responsive to a receive clock signal to capture data coupled to the data bus to which it is coupled, including the repeatedly coupled expected data pattern. The receiver being operable in the initialization mode to incrementally alter the phase of the receive clock signal to determine the phases of the receive clock signal that are able to capture received data patterns that match a expected data pattern. The receiver then determines a final value for the phase of the receive clock signal based on the determination of the phases of the receive clock signal that are able to capture received data patterns that match the expected data pattern. This final phase value is then used during normal operation as the phase of the receive clock signal.

DETAILED DESCRIPTION OF THE INVENTION

Embodiments of the present invention are directed to a memory module and memory controller each having the capability of generating a clock signal for strobing data signals during the "eye" of the data signals when the data signals are valid. Certain details are set forth below to provide a sufficient understanding of various embodiments of the invention. However, it will be clear to one skilled in the art that the invention may be practiced without these particular details. In other instances, well-known circuits, control signals, and timing protocols have not been shown in detail in order to avoid unnecessarily obscuring the invention. Also, although the embodiments are explained with reference to generating a clock signal to strobe data signals, it will be understood that the same principle can be used to generate a clock signal to strobe command and address signals.

Figure 1:
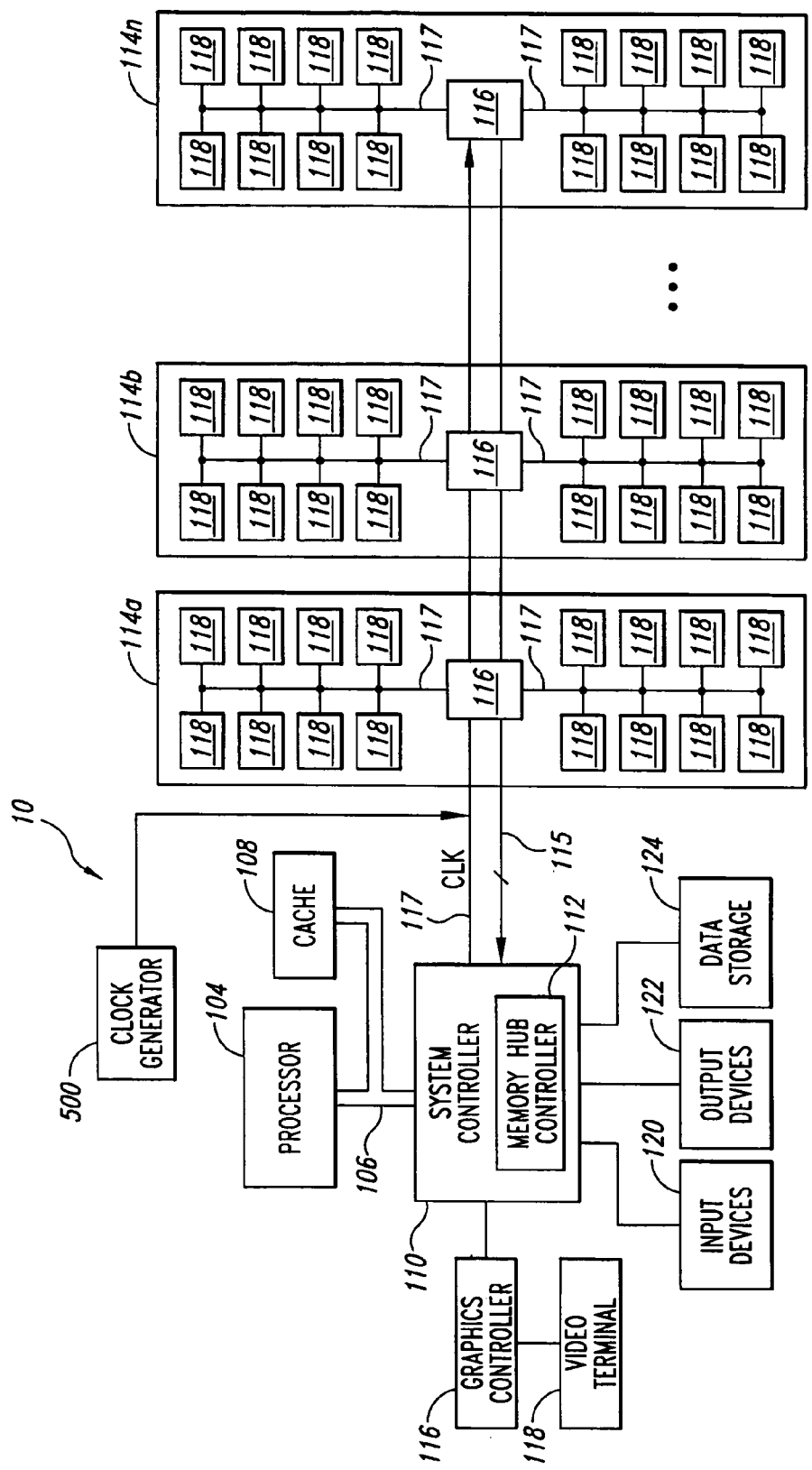
FIG. 1 is a block diagram of a computer system that includes several memory modules having a memory hub architecture coupled to a memory hub controller.
Figure 2:
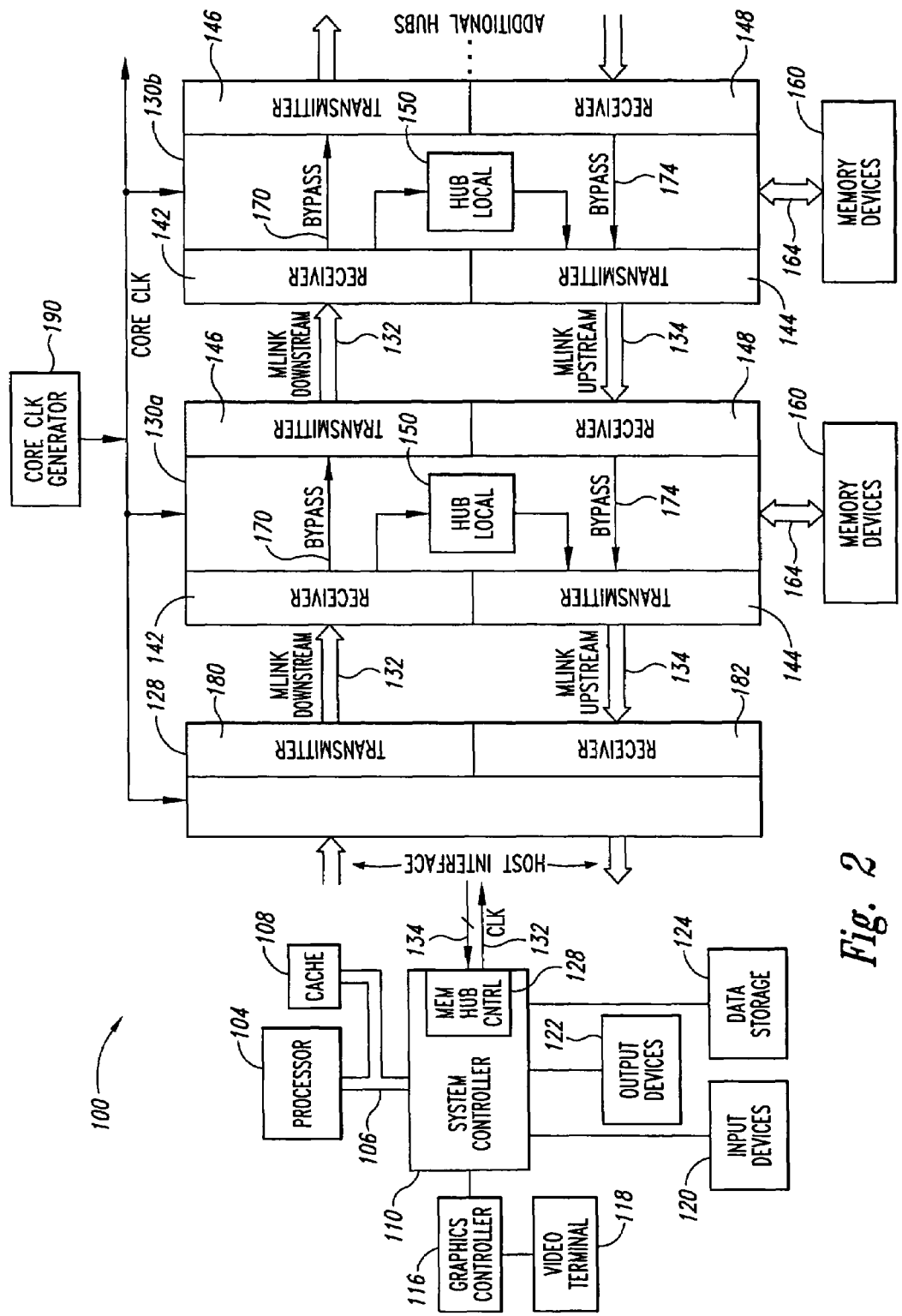
FIG. 2 is a block diagram of a computer system that includes several memory modules having a memory hub architecture according to one embodiment of the present invention.

A computer system 100 having a hub memory system according to one embodiment of the invention is shown in FIG. 2. The computer system 100 uses many of the same components that are used in the computer system 10 of FIG. 1. Therefore, in the interest of brevity, these components have been provided with the same reference numerals, and an explanation of their the functions and operation will not be repeated.

As in the computer system 10 of FIG. 1, the system controller 110 also includes a memory hub controller 128 that is coupled to several memory modules 130a,b...n, which serve as system memory for the computer system 100. The memory modules 130 are each coupled to a high-speed downstream bus 132 and a high-speed upstream bus 134. The downstream bus 132 extends downstream from the memory hub controller 128 and downstream from each of the memory modules 130 except the memory module 130n furthest from the memory hub controller 128. Similarly, the upstream bus 134 extends upstream from each of the memory modules 130. Each of these buses 132, 134, include a discrete data bus, although they may also include discrete command and address buses, a combined command/address bus, or some other bus system. However, the explanation of the various embodiments will be with respect to a data bus, it being understood that a similar technique can be used to strobe command and address signals.

The downstream bus 132 couple data away from the memory hub controller 128, and the upstream bus 134 couple data toward the memory hub controller 128. Therefore, the downstream bus 132 couples write data to and from each of the memory modules 130, except for the memory module 130n furthest downstream from the memory hub controller 128, which only receives write data. Similarly, the upstream bus 134 couples read data to and from each of the memory modules 130, except for the memory module 130n furthest downstream from the memory hub controller 128, which only transmits read data. The downstream bus 132 also couples write data from the memory hub controller 128, and the upstream bus 134 couples read data to the memory hub controller 128. Significantly, the buses 132, 134 need not couple clock signals to and from the memory modules 130 and the memory hub controller 128 for the purpose of allowing the memory modules 130 to capture data transmitted through the buses 132, 134. Instead, as explained in greater detail below, each of the memory modules 130 and the memory hub controller 128 generates signals internally to strobe the data coupled through the buses 132, 134.

The memory modules 130 are shown coupled to the memory hub controller 128 in a point-to-point coupling arrangement in which each of the buses 132, 134 are coupled only between two points. However, it will be understood that other topologies may also be used. For example, it may be possible to use a multi-drop arrangement in which a single downstream bus (not shown) and a single upstream bus (not shown) are coupled to all of the memory modules 130. A switching topology may also be used in which the, memory hub controller 1Z8 is selectively coupled to each of the memory modules 130 through a switch (not shown). Other topologies that may be used will be apparent to one skilled in the art.

Each of the memory modules 130 includes a first receiver 142 that receives write data through the downstream bus 132, a first transmitter 144 that transmits read data upstream through the upstream bus 134, a second transmitter 146 that transmits write data downstream through the downstream bus 132, and a second receiver 148 that receives read data through the upstream bus 134.

The memory modules 130 also each include a memory hub local 150 that is coupled to its first receiver 142 and its first transmitter 144. The memory hub local 150 receives write data through the downstream bus 132 and the first receiver 142 and couples the write data to one or more of sixteen memory devices 160, which, in the example illustrated in FIG. 2, are synchronous dynamic random access memory ("SDRAM") devices. However, a fewer or greater number of memory devices 160 may be used, and memory devices other than SDRAM devices may also be used. The memory hub local 150 is coupled to each of the memory devices 160 through a bus system 164, which normally includes a control bus, an address bus, and a data bus. However, other bus systems, such as a bus system using a shared command/address bus, may also be used.

The memory hub local 150 also receives read data from one or more of the memory devices 160 and couples the read data through the first transmitter 144 and the upstream bus 134. In the event the write data coupled through the downstream bus 132 and the first receiver 142 is not being directed to the memory devices 160 in the memory module 130 receiving the write data, the write data are coupled though a downstream bypass path 170 to the second transmitter 146 for coupling through the downstream bus 132. Similarly, if read data is being transmitted from a downstream memory module 130, the read data is coupled through the upstream bus 134 and the second receiver 148. The read data are then coupled upstream through an upstream bypass path 174, and then through the first transmitter 144 and the upstream bus 134. The second receiver 148 and the second transmitter 146 in the memory module 130n furthest downstream from the memory hub controller 128 are not used and may be omitted from the memory module 130n.

The memory hub controller 128 also includes a transmitter 180 coupled to the downstream bus 132, and a receiver 182 coupled to the upstream bus 134. The downstream bus 132 from the transmitter 180 and the upstream bus 134 to the receiver 182 are coupled only to the memory module 130a that is the furthest upstream to the memory hub controller 128. The transmitter 180 couples write data from the memory hub controller 128, and the receiver 182 couples read data to the memory hub controller 128.

The computer system 100 also includes a reference clock generator 190, which generates a clock signal that is coupled to the memory hub controller 128 and each of the memory modules 130. The memory hub controller 128 and the memory modules 130 use the reference clock to generate two internal clock signals that, in the embodiment of FIG. 2, have frequencies of two times, and one-half the frequency of the reference clock signal. The 2× internal clock signal is used as a transmit clock to strobe data from the transmitters 144, 146, 180. As explained in considerable detail below, the receivers 142, 148, 182 adjust the phase of the internal clock signal to generate a receive clock signal that is used to strobe data into the receivers 142, 148, 182. Briefly, the receivers 142, 148, 182 perform this function by receiving a known data pattern from a transmitter 144, 146, 180 to which it is coupled, and attempt to capture that data pattern by strobing the data as the phases of the receive clock signals are incrementally varied. The phase of the receive clock signal that best captures the data pattern is then used to strobe data into the receivers 142, 148, 182 in normal operation.

Figure 3:
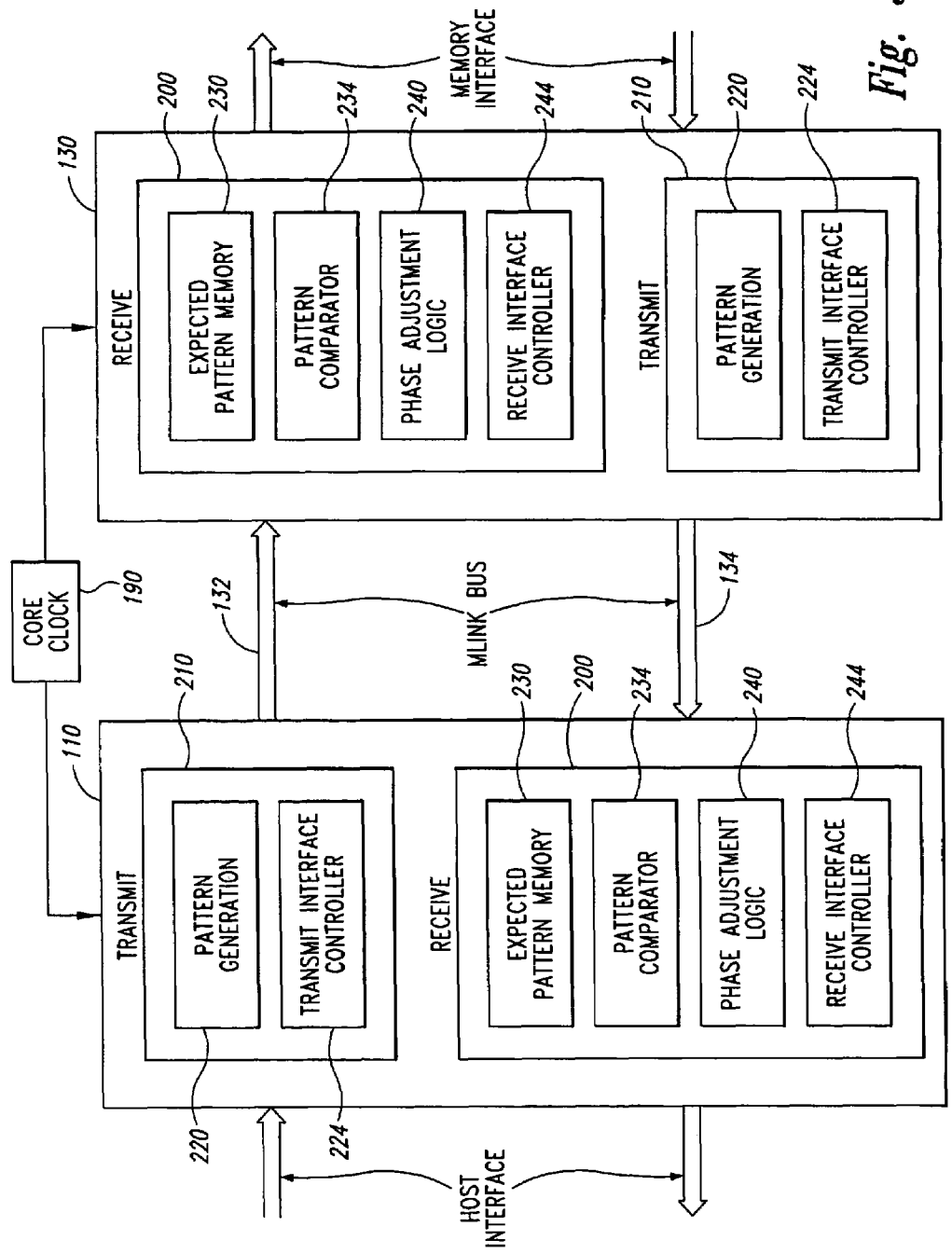
FIG. 3 is a block diagram of one embodiment of receivers and transmitters used in the computer system of FIG. 2 or some other system.

One embodiment of the receivers 142, 182 and the transmitters 144, 180 in the memory hub controller 128 and in one of the memory modules 130 is shown in FIG. 3. In both cases, a receiver 200 functions as both receivers 142, 148 in the memory module 130 and the receiver 182 in the memory hub controller 128, and a transmitter 210 functions as both transmitters 144, 146 in the memory module 130 as well as the single transmitter 180 in the memory hub controller 128. The transmitter 210 includes a pattern generator 220 that generates a predetermined pattern of data bits, and a transmit interface control 224 that controls the transmitting of the pattern. In the embodiment of FIG. 3, the same pattern is transmitted on all of the data bits of the buses 132, 134. During an initialization phase of the receiver 200 and transmitter 210, the transmitter 210 continuously repeats its transmission of the data pattern.

As previously explained, the receiver 200 receives the data bits from the transmitter 210 and strobes them in using a receive clock signal generated from the clock signal received from the clock generator 500 and having four times the frequency of the core clock. More specifically, in one embodiment of the invention, the pattern transmitted by the transmitter 210 is the following 32-bit pattern divided into four cycles each having 8 bits: "01011011 11000101 10010011 00101100" (hex "5BC5932C"). The data bit pattern is transmitted from right to left. In the embodiment of FIG. 3, a bit is strobed into the receiver 200 on each transition of the receive clock signal, so two bits are captured by the receiver 200 on each receive clock cycle. Since the receive clock has a frequency of four times the core clock, eight bits of data are captured during each cycle of the core clock.

In the embodiment of FIG. 3, the first bit is always captured on the positive edge of the receive clock signal. As a result, there are 16 possible patterns of valid data captured by the receiver 200, namely, the transmitted 32-bit pattern shifted by two bits for each pattern. An expected pattern memory 230 stores all 16 of these possible patterns, which, as previously explained, consists of eight bits.

In the embodiment of FIG. 3, a pattern comparator 234 performs three comparisons. First, it checks all of the data bits of the bus 132 to ensure that they all have the same value as each data bit is captured since the same data are transmitted on each data bit of the bus 132. The same comparison is performed on the bus 134.

In the second comparison, the pattern comparator 234 compares the eight data bits captured in the receiver 200 for each core cycle to the sixteen valid 8-bit data bit patterns stored in an expected pattern memory 230. For purposes of this comparison, it can use any of the 32 bits captured on each transition of the receive clock signal since the first comparison confirmed that all 32 bits were the same. Based on this comparison, phase adjustment logic 240 adjusts the phase of the receive clock signal so that it can best capture the data coupled to the receiver. More specifically, the pattern comparator 234 compares the 8 bits received during any core cycle to the 16 valid patterns stored in the expected pattern memory 230 to adjust the phase of the receive clock signal. The above operation is controlled by a receive interface controller 244, the operation of which will be explained with reference to the flow chart of FIG. 5.

In the third comparison, the pattern comparator 234 checks an additional $33^{rd}$ bit, which functions as a control bit. The pattern that is sent on the buses 132, 134 is also sent on the control bit for each of these buses. The eight bits captured on one core clock is compared in the same manner as the second comparison.

Figure 4:
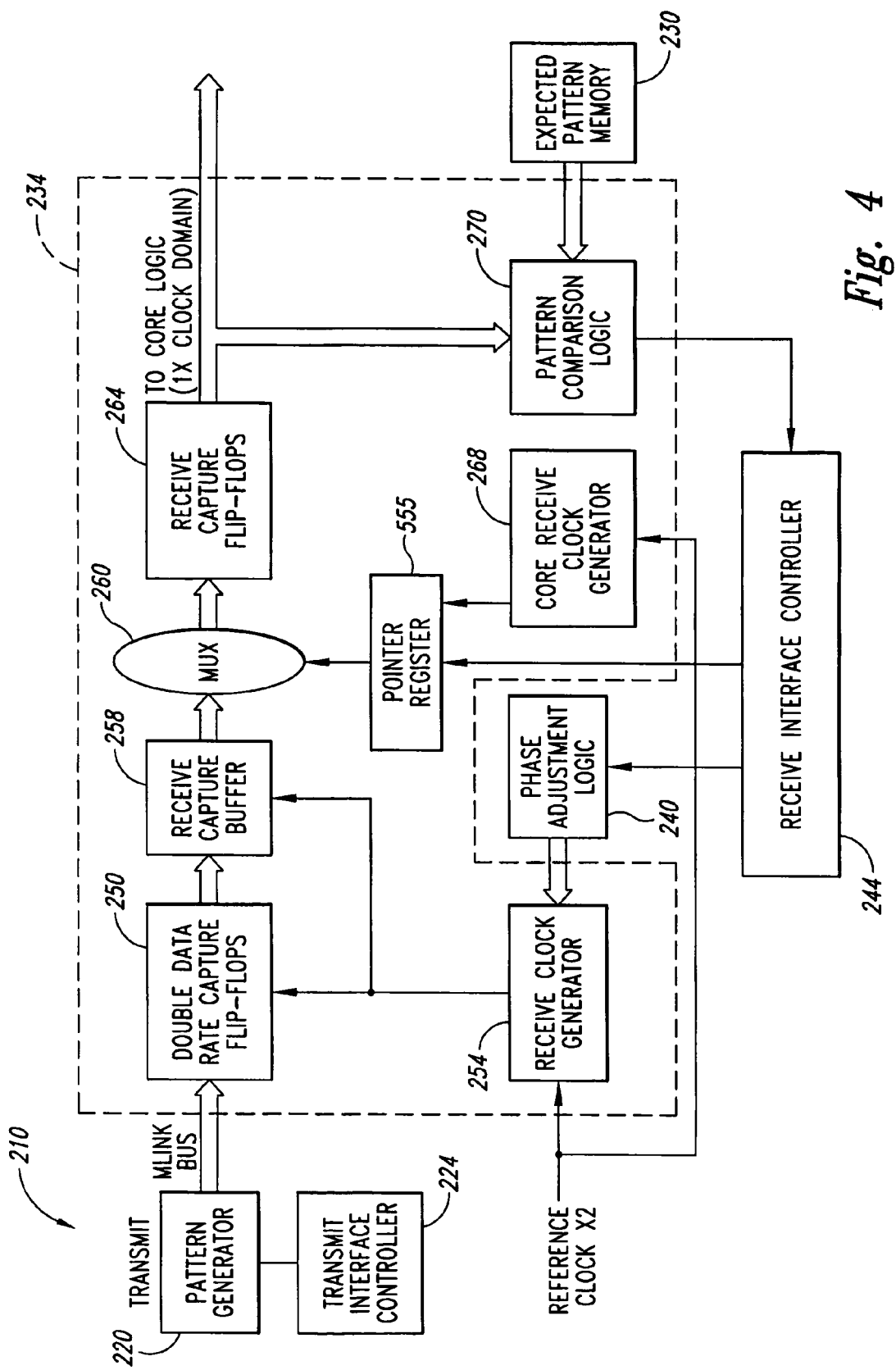
FIG. 4 is a block diagram of one embodiment of a pattern comparator used in the receivers of FIG. 3.

One embodiment of the pattern comparator 234 is shown in FIG. 4 along with the pattern generator 220 and the transmit interface controller 224 in the transmitter 210 and the expected pattern memory 230, the phase adjustment logic 240 and the receive interface controller 244 as shown in FIG. 3. The pattern comparator 234 includes a set of 32 double data rate ("DDR") flip-flops 250 that receive the receive clock signal from a receive clock generator 254 and capture 32 bits of data responsive to each transition of the receive clock signal. As each 32 bits of data are captured by the flip-flops 250, the 32 bits of data that were captured on the previous transition of the receive clock signal are transferred to a receive capture buffer 258. The buffer 258 is a recirculating buffer that is able to store data from 24 transitions of the receive clock signal, which occur responsive to twelve periods of the receive clock signal or three periods of the core clock signal. Thus, the buffer 258 stores 768 bits of data (i.e., 24*32), and, since it is a recirculating buffer, the oldest data bits stored in the buffer 258 are overwritten with new data bits. The data stored in the receive capture buffer 258 are 32 bits for each of the positive edge and the negative edge of the receive clock signal. There are 12 locations in the buffer 258 that store data for the positive edge and 12 locations in the buffer 258 that store data for the negative edge. Each of these locations is 32 bits wide. The receive capture buffer 258 outputs data from 4 locations for the positive edge and 4 locations for the negative edge. As a result, 256 bits are coupled from the buffer 258, i.e., 32 bits for each of 8 locations.

The 32 bits from the receive capture buffer 258 are applied to a multiplexer 260, which selects one of four sets of bits for coupling to a set of flip-flops 264. Each set consists of 4 bits from 4 respective locations for the positive edge and 4 bits from 4 respective locations for the negative edge. The first set consists of bits 0, 1, 2, 3 for both the positive and negative edges, the second set consists of bits 4, 5, 6, 7 for both the positive and negative edges, the third set consists of bits 8, 9, 10, 11 for both the positive and negative edges. One of these three sets of eight data bits are selected by a pointer register 266, which is incremented by the receive interface controller 244 in a manner that will be explained below. The flip-flops 264 are clocked by an internal core clock signal that is generated from the reference clock signal.

The eight received data bits captured by the flip-flops 264 are coupled to pattern comparison logic 270, which also receives the sixteen 8-bit patterns stored in the expected pattern memory 230. The pattern comparison logic 270 then issues a pass/fail ("P/F*") signal to the receive interface controller 244 indicative of whether the data bits from the flip-flops 264 match any of the patterns stored in the expected pattern memory 230.

Figure 5:
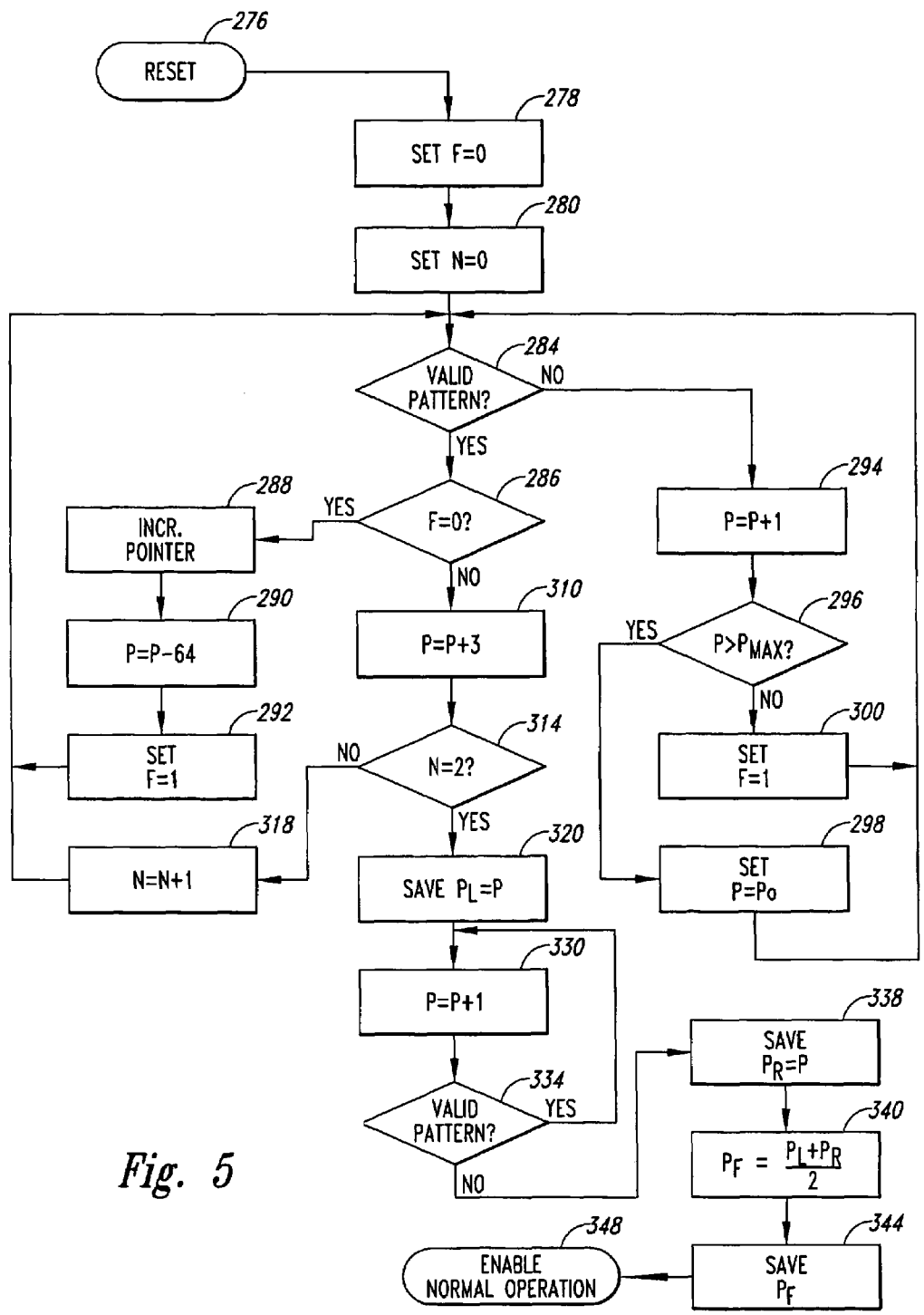
FIG. 5 is a flow chart showing the operation of a receive interface controller that controls the operation of the receivers shown in FIGS. 3 and 4.

The manner in which the receive interface controller 244 operates the receiver 200 will now be explained with reference to the flow-chart of FIG. 5. It will be understood by one skilled in the art that the receive interface controller 244 can be implemented as a properly programmed processor or by some other means.

After the receiver 200 is powered-up, a reset occurs at step 276, an initial startup indicator flag is set to "0" at step 278, and a variable N is set to 0 at step 280. The pattern comparator 234 then determines if the received data pattern is a valid data pattern at step 284. The received pattern will be a valid pattern if the first data bit captured is any even numbered bit, each of which is transmitted on a rising edge of the transmit clock signal. Specifically, if the data pattern "01011011 11000101 10010011 00101100" is transmitted (again, from right to left), a valid data pattern will be any eight-bit sequence of the transmitted pattern that starts on an even bit, i.e., "00101100", "11001011", or "00110010" . . . . If the pattern comparator 134 detected a valid pattern at step 284, it checks the value of the flag at step 286. The flag will initially be the "0" because it was set to that value at step 278. The flag is used to indicate if this is the first pass through step 284. This is needed because an initial passing condition needs to be handled differently from other passes. The pattern comparator 134 will increment a pointer at step 288 to cause the expected pattern memory 230 to output the next 8-bit pattern in sequence, which will subsequently be compared to 8 bits strobed into the receiver 200 by the receive clock signal. Additionally, if the pattern comparator 134 detected a valid pattern at step 284, the phase adjustment logic 240 decrements the phase ("P") of the receive clock signal at step 290 by a number of increments equal to one-half of a receive clock signal period. In the embodiment of FIGS. 3 and 4, the receive clock signal is divided into 128 increments, so, in the event a valid pattern is detected, the phase of the receive clock signal is decremented by 64 increments. The first pass flag is then set to "1" at step 292, and the operation then returns to step 284, where an invalid pattern should be detected because each data bit that was strobed in by a positive edge of the receive clock signal will now be strobed in by a negative edge of the receive clock signal.

If the pattern comparator 234 detected an invalid pattern at step 284, the phase of the receive clock signal is increased by one increment during step 294, and a check is made at 296 to determine if the phase adjustment causes the phase of the receive clock signal exceeds its limit. If so, the phase of the receive clock signal is reset to an initial value at step 298 and a pointer register 555 is incremented by one. Operation then returns to step 284 to determine if a valid pattern has been received. In summary, if the received data pattern is initially valid, the receive clock is shifted by 180 degrees so that it is no longer valid. When the received pattern either becomes invalid in this manner or is initially invalid, the phase of the receive clock signal is repetitively incremented by 1 by looping through steps 284, 296, and 300.

After steps 284, 296, and 300 have occurred one or more times, the received data pattern will eventually become valid. When this occurs, the "left" edge of the data valid "eye," the minimum phase shift of the receive clock signal that can capture valid data, has been found. The operation then progresses from step 284 to step 286. However, since the flag was set to "1" at either step 292 or step 300, the operation now progress to step 310 where addition phase shifts are added to the receive clock signal to ensure that it will always be able to capture valid data with this phase shift. Specifically, the phase is incremented by 3 increments at step 310, and a determination is made at step 314 whether a variable N that was set to 0 at step 280 is equal to 2. The first time the phase of the receive clock signal is incremented at step 310, N will still be equal to 0. Therefore, the operation will increment the variable in step 318 and return to step 284 to determine if the receive clock signal can still capture valid data. If so, the operation loops through steps 286, 310, 314 and 318 until the variable N is equal to 2. At this point the phase of the receive clock signal is saved at step 320 as the phase $P_L$ corresponding to the left edge of the data valid eye.

After the left edge of the data valid eye has been found, the receive interface controller 244 operates to find the right edge of the data valid eye. It does so by incrementing the phase of the receive clock signal by one increment at step 330 and then checking if doing so causes an invalid data pattern to be captured at step 334. Since the left edge of the data eye was found by the captured data pattern becoming valid, the data pattern is not likely to be invalid during the first pass through step 334. As a result, the operation returns to step 330 to again increment the phase of the receive clock signal. The operation continues to loop through steps 330, 334 until an invalid data pattern is detected at step 334. When this occurs, the "right" edge of the data valid "eye," the maximum phase shift of the receive clock signal that can capture valid data, has been found. The program then saves the phase of the receive clock signal at step 338 as the phase $P_R$ corresponding to the right edge of the data valid eye.

The phase $P_F$ of the receive clock signal that will be used during normal operation is then calculated at step 340 using the formula $P_F=(P_F+P_L)/2$, which sets $P_F$ midway between $P_F$ and $P_L$. This phase value $P_F$ is then saved at step 344, and normal operation is enabled at step 348.

After the phase $P_F$ of the receive clock signal has been finalized, the receiver 200 in the memory hub controller 128 and each memory module 130 causes its respective transmitter 210 to communicate that fact to an upstream receiver. When the memory hub controller 128 has determined that all of the receivers 200 have been initialized, it ends the initialization mode and begins normal operation. One embodiment of a technique for communicating the synchronization status of the receivers 200 is described in U.S. patent application, Ser. No. 10/848,606 having a common inventor, which is incorporated herein by reference.

Figure 6:
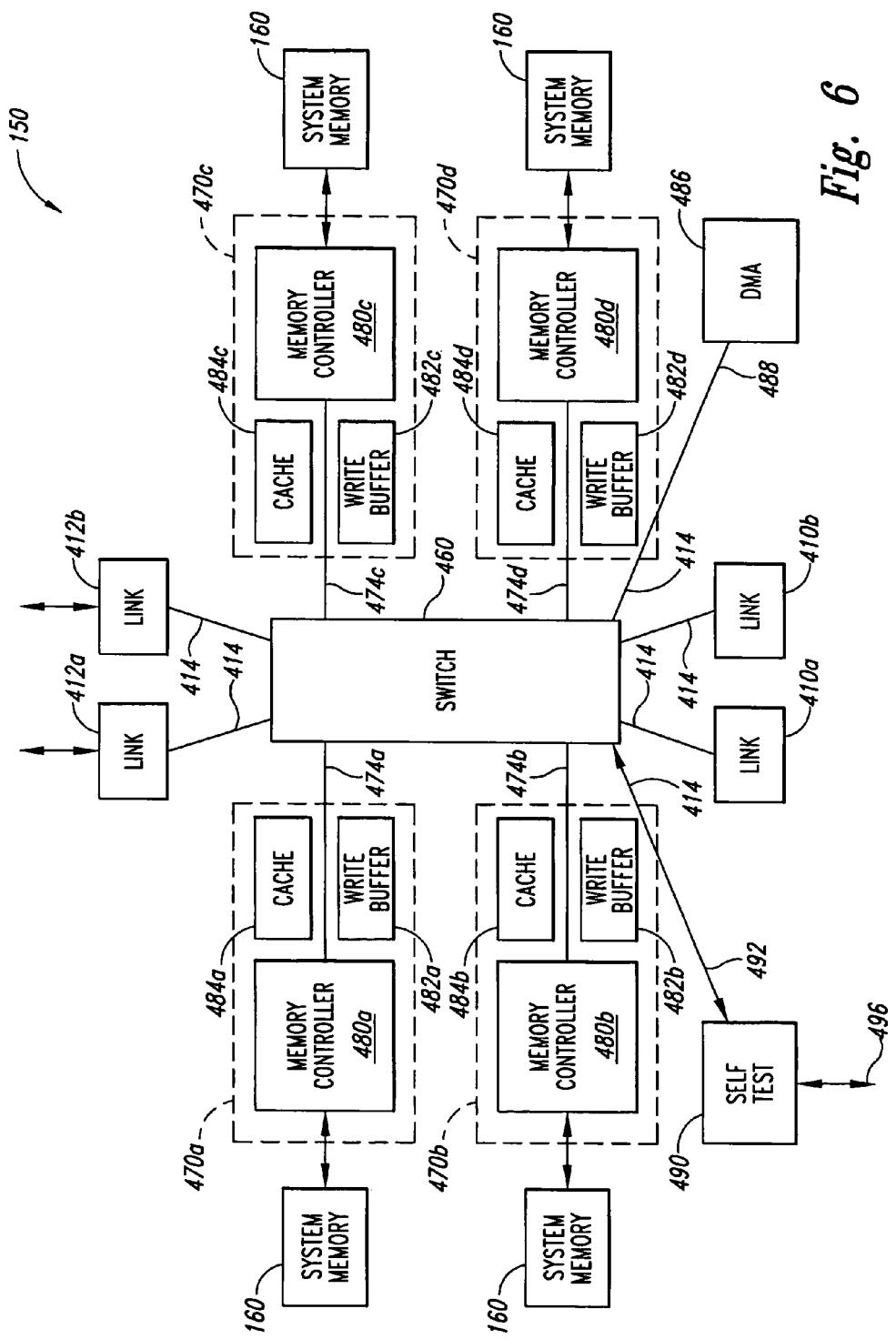
FIG. 6 is a block diagram of a memory hub that may be used the memory modules that are used in the computer system of FIG. 2.

FIG. 6 shows an embodiment of the memory hub local 150 according to the present invention, which can be used in the memory modules 130 of FIG. 2. The memory hub local 150 include two input bus interfaces 410a,d, which may be used to couple data into the memory hub local 150, and two output bus interfaces 412a,b, which may be used to couple data from the memory hub the memory hub local 150.

The bus interfaces 410a,b, 412a,b are coupled to a switch 460 through a plurality of bus and signal lines, represented by buses 414. The buses 414 are conventional, and include a write data bus and a read data bus, although a single bi-directional data bus may alternatively be provided to couple data in both directions through the bus interfaces 410a,b, 412a,b. It will be appreciated by those ordinarily skilled in the art that the buses 414 are provided by way of example, and that the buses 414 may include fewer or greater signal lines, such as further including a request line and a snoop line, which can be used for maintaining cache coherency.

The switch 460 is coupled to four memory interfaces 470a-d which are, in turn, coupled to the memory devices 160 (FIG. 2). By providing a separate and independent memory interface 470a-d for each set of memory devices 160, the memory hub local 150 avoids bus or memory bank conflicts that typically occur with single channel memory architectures. The switch 460 is coupled to each memory interface through a plurality of bus and signal lines, represented by buses 474. The buses 474 include a write data bus, a read data bus, and a request line. However, it will be understood that a single bidirectional data bus may alternatively be used instead of a separate write data bus and read data bus. Moreover, the buses 474 can include a greater or lesser number of signal lines than those previously described.

In an embodiment of the present invention, each memory interface 470a-d is specially adapted to the memory devices 160 to which it is coupled. More specifically, each memory interface 470a-d is specially adapted to provide and receive the specific signals received and generated, respectively, by the memory devices 160 to which it is coupled. Also, the memory interfaces 470a-d are capable of operating with memory devices 160 operating at different clock frequencies. As a result, the memory interfaces 470a-d isolate the processor 104 from changes that may occur at the interface between the memory hub 130 and memory devices 160 coupled to the memory hub local 150, and it provides a more controlled environment to which the memory devices 160 may interface.

The switch 460 coupling the bus interfaces 410a,b, 412a,b and the memory interfaces 470a-d can be any of a variety of conventional or hereinafter developed switches. For example, the switch 460 may be a cross-bar switch that can simultaneously couple bus interfaces 410a,b, 412a,b to each other to provide the downstream bypass path 170 and the upstream bypass path 174 shown in FIG. 2. The switch 460 can also be a set of multiplexers that do not provide the same level of connectivity as a cross-bar switch but nevertheless can couple the some or all of the bus interfaces 410a,b, 412a,b to each of the memory interfaces 470a-d. The switch 460 may also includes arbitration logic (not shown) to determine which memory accesses should receive priority over other memory accesses. Bus arbitration performing this function is well known to one skilled in the art.

With further reference to FIG. 6, each of the memory interfaces 470a-d includes a respective memory controller 480, a respective write buffer 482, and a respective cache memory unit 484. The memory controller 480 performs the same functions as a conventional memory controller by providing control, address and data signals to the memory devices 160 to which it is coupled and receiving data signals from the memory device 160 to which it is coupled. However, the nature of the signals sent and received by the memory controller 480 will correspond to the nature of the signals that the memory devices 160 are adapted to send and receive. The cache memory unit 484 includes the normal components of a cache memory, including a tag memory, a data memory, a comparator, and the like, as is well known in the art. The memory devices used in the write buffer 482 and the cache memory unit 484 may be either DRAM devices, static random access memory ("SRAM") devices, other types of memory devices, or a combination of all three. Furthermore, any or all of these memory devices as well as the other components used in the cache memory unit 484 may be either embedded or stand-alone devices.

The write buffer 482 in each memory interface 470a-d is used to store write requests while a read request is being serviced. In such a system, the processor 104 can issue a write request to a system memory device 440a-d even if the memory device to which the write request is directed is busy servicing a prior write or read request. The write buffer 482 preferably accumulates several write requests received from the switch 460, which may be interspersed with read requests, and subsequently applies them to each of the memory devices 160 in sequence without any intervening read requests. By pipelining the write requests in this manner, they can be more efficiently processed since delays inherent in read/write turn-arounds are avoided. The ability to buffer write requests to allow a read request to be serviced can also greatly reduce memory read latency since read requests can be given first priority regardless of their chronological order.

The use of the cache memory unit 484 in each memory interface 470a-d allows the processor 104 to receive data responsive to a read command directed to a respective system memory device 160 without waiting for the memory device 160 to provide such data in the event that the data was recently read from or written to that memory device 160. The cache memory unit 484 thus reduces the read latency of the system memory devices 440a-d to maximize the memory bandwidth of the computer system. Similarly, the processor 104 can store write data in the cache memory unit 484 and then perform other functions while the memory controller 480 in the same memory interface 470a-d transfers the write data from the cache memory unit 484 to the memory device 160 to which it is coupled.

Further included in the memory hub local 150 may be a self-test module 490 coupled to the switch 460 through a test bus 492. The self-test module 490 is further coupled to a maintenance bus 496, such as a System Management Bus (SMBus) or a maintenance bus according to the Joint Test Action Group (JTAG) and IEEE 1149.1 standards. Both the SMBus and JTAG standards are well known by those ordinarily skilled in the art. Generally, the maintenance bus 496 provides a user access to the self-test module 490 in order to set memory testing parameters and receive test results. For example, the user can couple a separate PC host via the maintenance bus 496 to set the relative timing between signals that are applied to the memory devices 160. Similarly, data indicative of the relative timing between signals that are received from the memory devices 160 can be coupled to the PC host via the maintenance bus 496.

Further included in the memory hub local 150 may be a DMA engine 486 coupled to the switch 460 through a bus 488. The DMA engine 486 enables the memory hub 30 to move blocks of data from one location in one of the memory devices 160 to another location in the memory device without intervention from the processor 104. The bus 488 includes a plurality of conventional bus lines and signal lines, such as address, control, data buses, and the like, for handling data transfers in the system memory. Conventional DMA operations well known by those ordinarily skilled in the art can be implemented by the DMA engine 486.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A memory system comprising:
a reference clock generator operable to generate a reference clock signal;
a first memory module coupled to the reference clock generator, the first memory module operable to generate an internal clock signal based at least in part on the reference clock signal;
a second memory module coupled to the reference clock generator and operable to generate an internal clock signal based at least in part on the reference clock signal, the second memory module being coupled to the first memory module, the second memory module operable to transmit data to the first memory module and to receive data from the first memory module; and
wherein the first and second memory modules each comprises a receiver comprising:
a phase adjustment circuit configured to receive data and a predetermined pattern of data, and operable to compare the received data and the predetermined pattern of data to adjust a phase of its internal clock signal based on the comparison to generate a receive clock signal; and
a capture circuit coupled to receive the receive clock signal from the phase adjustment circuit and the data transmitted from the other memory module, the capture circuit being operable to capture the data transmitted from the other memory module in the receiver responsive to the receive clock signal.

2. The memory system of claim 1 wherein the first memory module further comprises a plurality of memory devices coupled to the receiver.

3. The memory system of claim 2 wherein the plurality of memory devices comprises a plurality of synchronous random access memory devices.

4. The memory system of claim 1 wherein the receiver is operable to generate a second internal clock signal based at least in part on the reference clock signal, wherein either the first or second memory modules are each operable to transmit the data to the other memory module using the second internal clock signal.

5. The memory system of claim 1 wherein the second memory module further comprises a second plurality of memory devices, the data transmitted to the first memory module comprising read data originating from at least one of the second plurality of memory devices.

6. The memory system of claim 1, the data comprising a read request.

7. The memory system of claim 1, the data comprising a write request.

8. The memory system of claim 1 further comprising:
a processor; and
a bus serially coupling the processor, the first memory module, and the second module, and wherein the data is transmitted from the second module to the first module on the bus.

9. The memory system of claim 1 wherein a frequency of the reference clock signal is different from a frequency of the internal clock signal.

10. The memory system of claim 1, the first memory module further comprising:
an expected pattern memory operable to provide the predetermined pattern of data; and
a comparator coupled to the expected pattern memory and the phase adjustment circuit, the comparator operable to compare data captured at the receiver with data stored in the expected pattern memory and generate a comparison signal, the phase adjustment circuit operable to adjust the phase of the internal clock signal responsive to the comparison signal.

11. The memory system of claim 1 wherein the first memory module is operable to generate a second internal clock signal based at least in part on the reference clock signal.

12. The memory system of claim 11 wherein the first memory module further comprises a transmitter operable to transmit data utilizing the second internal clock signal.

13. A method for managing asynchronous communication between a first and a second memory module, the method comprising:
receiving a reference clock signal at the first memory module;
generating a receive clock signal in the first memory module, the receive clock signal having a phase that is different from a phase of the reference clock signal;
receiving a data pattern to match to a predetermined pattern of data;
incrementally adjusting the phase of the receive clock signal based on the received data pattern matching the predetermined pattern of data; and
utilizing the receive clock signal to strobe data into the first memory module.

14. The method according to claim 13 wherein the data is transmitted to the first memory module by the second memory module utilizing a second internal clock signal generated by the second memory module.

15. The method according to claim 13 wherein a frequency of the reference clock signal is different from a frequency of the receive clock signal.

16. The method according to claim 13 wherein the act of generating the receive clock signal comprises generating an internal clock signal having a different frequency than the reference clock signal and adjusting a phase of the internal clock signal to generate the receive clock signal.

17. The method according to claim 16 further comprising:
determining a phase adjustment; and
applying the phase adjustment to the internal clock signal to generate the receive clock signal.

18. The method according to claim 17 wherein the act of determining a phase adjustment comprises identifying a left edge of a data valid eye at the receiver.

19. The method according to claim 17 wherein the act of determining a phase adjustment comprises identifying a right edge of a data valid eye at the receiver.

20. The method according to claim 17 wherein the act of determining a phase adjustment comprises identifying a left and a right edge of a data valid eye at the receiver and setting the phase adjustment equal to a value between a left phase shift corresponding to the left edge of the data valid eye and a right phase shift corresponding to the right edge of the data valid eye.

21. The method according to claim 20 wherein the phase adjustment is midway between the left phase shift and the right phase shift.

22. A memory module configured to receive data and operable to generate an internal clock signal responsive to a received reference clock signal, the memory module comprising:
a plurality of memory devices; and
a receiver coupled to the memory devices, the receiver comprising:
a phase adjustment circuit configured to receive the receive data and a predetermined pattern of data, and operable to compare the receive data to the predetermined pattern of data and adjust a phase of the internal clock signal based on the comparision to generate a receive clock signal; and
a capture circuit coupled to receive the receive clock signal from the phase adjustment circuit and data transmitted to the memory module, the capture circuit being operable to capture data in the receiver responsive to the receive clock signal.

23. The memory module of claim 22 wherein the plurality of memory devices comprises a plurality of synchronous random access memory devices.

24. The memory module of claim 22 wherein a frequency of the reference clock signal is different from a frequency of the internal clock signal.

25. The memory module of claim 22 further comprising:
an expected pattern memory operable to provide a predetermined pattern of data; and
a comparator coupled to the expected pattern memory and the phase adjustment circuit, the comparator operable to compare data captured at the receiver with data stored in the expected pattern memory and generate a comparison signal, the phase adjustment circuit operable to adjust the phase of the internal clock signal responsive to the comparison signal.

26. The memory module of claim 22 wherein the memory module is further operable to generate a second internal clock signal based at least in part on the reference clock signal.

27. The memory module of claim 26 wherein the memory module further comprises a transmitter operable to transmit data utilizing the second internal clock signal.

28. The memory module of claim 22 further comprising a second receiver, the first receiver coupleable to a downstream bus and the second receiver coupleable to an upstream bus.

29. The memory module of claim 22 further comprising a memory hub coupled to the plurality of memory devices and the receiver.

\* \* \* \* \*